US009268702B2

(12) United States Patent
Bilas et al.

(10) Patent No.: US 9,268,702 B2
(45) Date of Patent: Feb. 23, 2016

(54) STORAGE I/O PATH PARTITIONING TO ELIMINATE I/O INTERFERENCE IN CONSOLIDATED SERVERS

(71) Applicant: Institute of Computer Science (ICS) of the Foundation for Research and Technology—Hellas (FORTH), Heraklion (GR)

(72) Inventors: Angelos Bilas, Heraklion (GR); Konstantinos Chasapis, Heraklion (GR); Markos Fountoulakis, Heraklion (GR); Stelios Mavridis, Heraklion (GR); Spyridon Papageorgiou, Heraklion (GR); Manolis Marazakis, Heraklion (GR); Yannis Sfakianakis, Heraklion (GR)

(73) Assignee: Institute of Computer Science (ICS) of the Foundation for Research and Technology—Hellas (FORTH), Heraklion (GR)

( * ) Notice: Subject to any disclaimer, the term of this patent is extended or adjusted under 35 U.S.C. 154(b) by 303 days.

(21) Appl. No.: 13/861,101

(22) Filed: Apr. 11, 2013

(65) Prior Publication Data

US 2014/0310473 A1    Oct. 16, 2014

(51) Int. Cl.
*G06F 12/00*    (2006.01)
*G06F 12/08*    (2006.01)
(Continued)

(52) U.S. Cl.
CPC ............ *G06F 12/0875* (2013.01); *G06F 11/00* (2013.01); *G06F 11/1435* (2013.01); *G06F 11/1471* (2013.01); *G06F 11/3409* (2013.01); *G06F 11/3414* (2013.01);
(Continued)

(58) Field of Classification Search
None
See application file for complete search history.

(56) References Cited

U.S. PATENT DOCUMENTS 4,916,605 A * 4/1990 Beardsley ........... G06F 11/1666
                                                              701/18
5,790,848 A * 8/1998 Wlaschin ...................... 707/661
(Continued)

OTHER PUBLICATIONS

Akkan, H., et al., "Stepping Towards Noiseless Linux Environment," in Proceedings of the 2nd International Workshop on Runtime and Operating Systems for Supercomputers (ROSS), dated Jun. 2012.
(Continued)

*Primary Examiner* — Yaima Rigol
*Assistant Examiner* — Tasnima Matin
(74) *Attorney, Agent, or Firm* — Warner Norcross & Judd LLP

(57) ABSTRACT

A method for storage input/output (I/O) path configuration in a system that includes at least one storage device in network communication with at least one computer processor; the method comprising providing in the I/O path into at least: (a) a block-based kernel-level filesystem, (b) an I/O cache module controlling an I/O cache implemented on a first computer readable medium, (c) a journaling module, and (d) a storage cache module controlling a storage cache implemented on a second computer readable medium, the second computer readable medium having a lower read/write speed than the first computer readable medium. Furthermore, the steps of translating by the filesystem, based on computer executable instructions executed by the at least one processor, a file I/O request made by an application executed by the at least one computer processor into a block I/O request and fulfilling by the at least one processor the block I/O request from one of the I/O cache and the storage cache complete the I/O operation.

14 Claims, 15 Drawing Sheets

(51) Int. Cl.
*G06F 11/00* (2006.01)
*G06F 11/14* (2006.01)
*G06F 11/34* (2006.01)

(52) U.S. Cl.
CPC ...... *G06F 11/3485* (2013.01); *G06F 2201/815* (2013.01); *G06F 2201/87* (2013.01)

(56) References Cited

U.S. PATENT DOCUMENTS

| | | | |
|---|---|---|---|
| 6,108,759 A * | 8/2000 | Orcutt et al. | 711/173 |
| 8,285,758 B1 * | 10/2012 | Bono et al. | 707/822 |
| 2008/0098209 A1 * | 4/2008 | Malaviya | 713/2 |
| 2008/0301256 A1 * | 12/2008 | McWilliams et al. | 709/214 |
| 2009/0216953 A1 * | 8/2009 | Rossi | 711/128 |
| 2013/0031308 A1 * | 1/2013 | De Spiegeleer et al. | 711/122 |

OTHER PUBLICATIONS

Altschul, S.F., et al., "Basic Local Alignment Search Tool," in Journal of Molecular Biology, 215:403-410, dated May 1990.
Banga, G., et al., "Resource Containers: A New Facility for Resource Management in Server Systems," in Proceedings of the Third Symposium on Operating Systems Design and Implementation (OSDI), dated Feb. 1999.
Bansal, S., et al., "Car: Clock with Adaptive Replacement," in Proceedings of the 3rd USENIX Converence on File and Storage Technologies (FAST), dated Mar. 2004.
Baumann, A., et al., "The Multikernel: A New OS Architecture for Scalable Multicore Systems," in Proceedings of the ACM SIGOPS 22nd Symposium on Operating Systems Principles (SOSP), dated Oct. 2009.
Boyd-Wickizer, S., et al., "An Analysis of Linux Scalability to Many Cores," in Proceedings of the 9th USENIX Conference on Operating Systems Design and Implementation (OSDI), dated 2010.
Chiang, R.C., et al., "Interference-Aware Scheduling for Data-Intensive Applications in Virtualized Environments," in Proceedings of 2011 International Conference for High Performance Computing, Networking, Storage and Analysis, pp. 47:1-47:12, dated Nov. 2011.
Kambadur, M., et al., "Measuring Interference Between Live Datacenter Application," in Proceedings of the International Conference on High Performance Computing, Networking, Storage and Analysis, pp. 51:1-51:12, IEEE Computer Society Press dated Nov. 2012.
Klonatos, Y., et al., "Azor: Using Two-Level Block Selection to Improve SSD-Based I/O Caches," In Proc. IEEE Inernational Conference on Networking, Architecture, and Storage (NAS), dated 2011.
Koh, Y., "An Analysis of Performance Interference Effects in Virtual Environments," in Performance Analysis of Systems Software, 2007; ISPASS 2007; IEEE International Symposium pp. 200-209, dated Apr. 2007.
Megiddo, N., "Arc: A Self-Tuning, Low Overhead Replacement Cache," in Proceedings of the 2nd USENIX Conference on File and Storage Technologies (FAST), dated Mar. 2003.
Oracle: "Why Solid-State Drives Usage Scenarios Are Expanding for the Datacenter," found at http://tinyurl.com/b57sk8s, Oracle White Paper, dated Apr. 2010.
Menage, P., "Cgroups Features, including Cpusets and Memory Controller," in Linux Kernel Cgroups Documentation, The Linux Kernel Archives, copyright 2004-2006.
Pu, X., et al., "Understanding Performance Interference of I/O Workload in Virtualized Cloud Environments," in IEEE Cloud, pp. 51-58, dated 2010.
Rixner, S., "Network Virtualization: Breaking the Performance Barrier," in ACM Queue, dated Jan. 2008.
Sullivan, D.G., et al., "Isolation with Flexibility: A Resource Management Framework for Central Servers," in Proceedings of the Annual Conference on USENIX Annual Technical Conference, ATEC, pp. 337-350, dated 2000.
Taylor, J., "Disagregation and Next-Generation Systems Design," presentation at the Open Compute Summit dated Jan. 16-17, 2013.
Verghese, B., et al., "Performance Isolation: Sharing and Isolation in Shared-Memory Multiprocessors," in Proceedings of the 8th International Conference on Architectural Support for Programming Languages and Operating Systems (ASPLOS), dated Oct. 1998.
Verma, A., et al., "Server Workload Analysis for Power Minimization Using Consolidation," in Proceedings of the 2009 Conference on USENIX Annual Technical Conference, dated 2009.
Wachs, M., et al., "Argon: Performance Insulation for Shared Storage Servers," in Proceedings of the 5th USENIX Conference on File and Storage Technologies (FAST), dated Feb. 2007.
Zheng, D., et al., "A Parallel Page Cache: Lops and Caching for Multicore Systems," in Proceedings of the 4th USENIX Conference on Hot Topics in Storage and File Systems, HotStorage, dated 2012.

\* cited by examiner

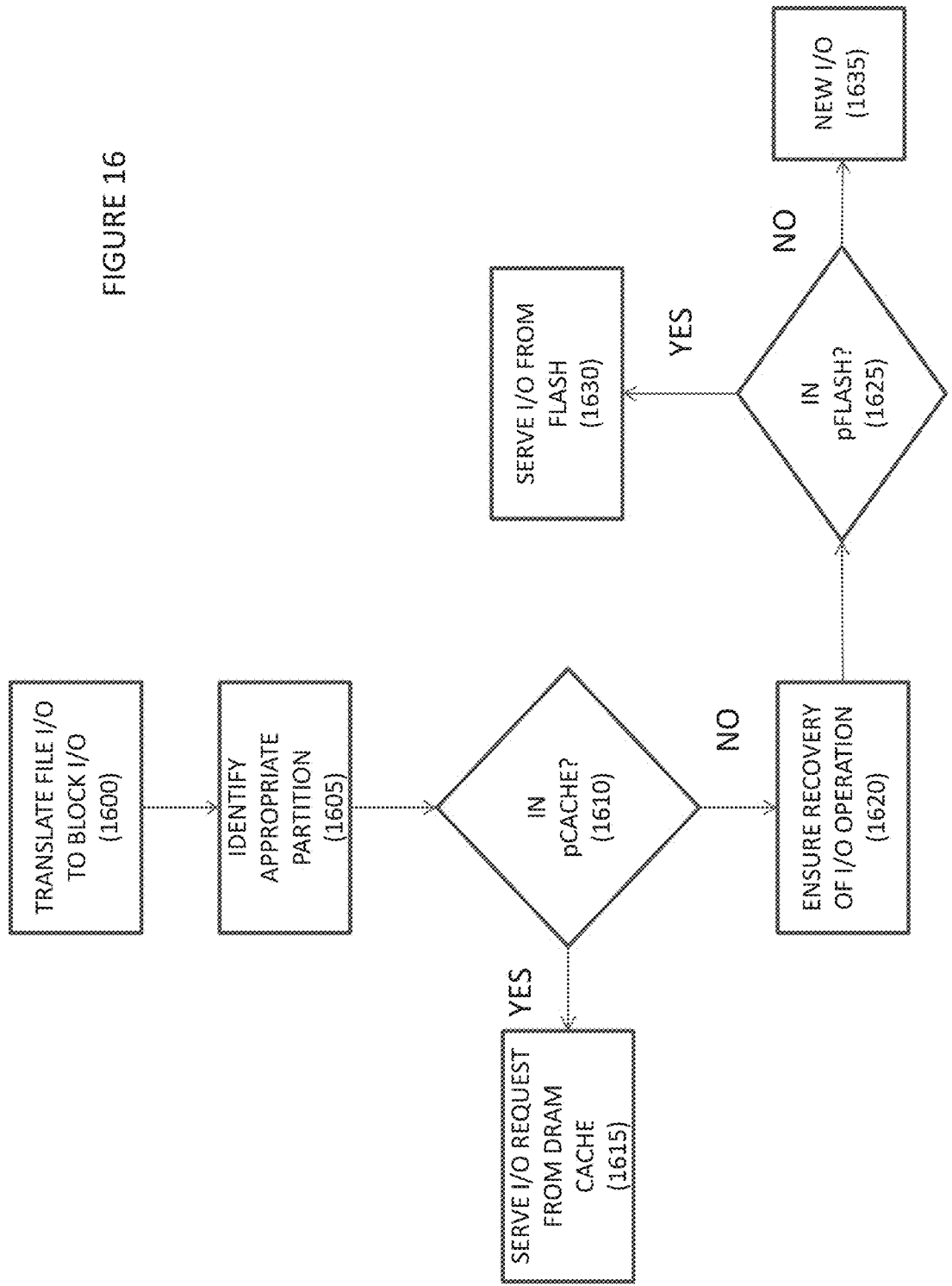

STORAGE I/O PATH PARTITIONING TO ELIMINATE I/O INTERFERENCE IN CONSOLIDATED SERVERS

This invention was supported by the European Commission under the 7th Framework Programs through the IOLANES project, contract number FP7-ICT-248615.

FIELD OF THE INVENTION

The invention relates to the field input/output (I/O) path performance, and in particular to a method and system for improving storage I/O path performance and performance isolation by partitioning the I/O path.

BACKGROUND OF THE INVENTION

Modern applications are shifting from compute-centric to data-centric arrangements as they require continuous access to persistent data rather than computing from memory-resident datasets. In addition, the trend towards application consolidation in data centers leads to running demanding workloads on modern servers with diverse I/O requirements. Furthermore, cost and energy efficiency constraints dictate building larger servers with many cores and I/O resources that host multiple applications. Until recently, the I/O subsystem in modern servers has been limited by the devices themselves. Today, with the availability of NAND-Flash based solid-state disks (SSDs), high IOPS are becoming economically viable for typical data center servers and flash is becoming a necessary layer in the storage hierarchy.

These trends have created a landscape with significant new challenges for the storage I/O path in modern servers. Independent workloads interfere with each other when competing for shared resources and they experience both performance degradation and a large variance. Competition for space in the DRAM I/O cache results in more accesses to the underlying tiers of the storage hierarchy. Mixed devices access patterns result in device performance well below nominal device capabilities. Shared buffers and structures in the I/O path results in increased contention, even for independent workloads accessing shared resources.

On today's servers, data-centric applications can experience severe performance degradation when ran concurrently with other applications. FIG. 1 illustrates this point for a server running multiple virtual machines (VMs), where each VM hosts a workload that performs some level of storage I/O. Production VM refers to the workload instance for which we are interested in improving its performance or maintaining acceptable performance. Noise VM refers to the workload instance that accesses a separate data-set and may interfere with the production VM. Three distinct I/O load profiles are considered, marked with low, mid, high. As shown, the performance degradation for the production VM when ran concurrently with another VM can be as high as 40× for a transaction processing workload, TPC-E, when looking at the transaction rate. For another transaction processing workload, TPC-W, the performance degradation can be as high as three orders of magnitude over the nominal case, when looking at the average transaction latency. It is important to note that the system where these workloads are running has adequate resources to support both the production and interfering VMs. However, the capacity available to the production VM is variable over time, on a unregulated system, resulting in severe performance degradation.

Improving I/O performance has been a problem tackled in many prior art works, and in particular in the storage I/O path across different workloads. This problem is exacerbated when the OS or hypervisor manages large amounts of I/O resources as a single pool, concurrently accessed by all workloads via a shared I/O path. For example, in Linux systems, Control groups (cgroups) is currently the only mechanism in the Linux kernel to limit resource usage per process group. cgroups allow users to specify resource limits per process group, for numerous resources in the Linux kernel, including cache sizes and bandwidth in the I/O path. cgroups still treat the I/O path as a single-shared entity and lead applications to compete, e.g. for buffers, locks, structures, and global allocation policies.

Other prior art has thus far focused on proportional fair-share allocation of resources, on relatively long timescales. Although these prior art arrangements limit the use, allocation, or scheduling of resources, applications still access each resource in a single, system-wide, shared pool via shared structures and metadata. For instance, there is still a single DRAM I/O cache in all cases, and usually shared devices.

These prior art problems are becoming more and more pertinent as the performance of storage improves with current technology trends. However, most prior art solutions have focused on improving upon the mechanisms used for synchronizing storage resource access. This results in the bottleneck being shifted from particular storage devices, or other physical resources, to the single I/O path from the storage resources to the kernel or user space in a computer system.

Accordingly, there is a need in the art for improving storage I/O path throughput or performance, especially in the presence of multiple workloads.

SUMMARY OF THE INVENTION

According to one embodiment of the invention, there is provided a method for storage input/output (I/O) path configuration in a system that includes at least one storage device in network communication with at least one computer processor; the method comprising providing in the I/O path into at least: (a) a block-based kernel-level filesystem, (b) an I/O cache module controlling an I/O cache implemented on a first computer readable medium, (c) a journaling module, (d) a storage cache module controlling a storage cache implemented on a second computer readable medium, the second computer readable medium having a lower read/write speed than the first computer readable medium; translating by the filesystem, based on computer executable instructions executed by the at least one processor, a file I/O request made by an application executed by the at least one computer processor into a block I/O request, and fulfilling by the at least one processor the block I/O request from one of the I/O cache and the storage cache.

According to an aspect of the invention, the fulfilling step further comprises determining by the I/O cache module if the block being requested is in the I/O cache; and upon a condition in which the block being requested is in the I/O cache, fulfilling the block request from the I/O cache; upon a condition in which the block being requested is not in the I/O cache, determining by the storage cache module if the block being requested is in the storage cache, and; and upon a condition in which the block being requested is in the storage cache, fulfilling the block request from the storage cache; upon a condition in which the block being requested is not in the storage cache, issuing a new I/O request.

According to another aspect, prior to the step of determining by the storage cache module, comprising logging by the journaling module the block I/O request.

According to another aspect, the logging comprises logging in a persistent transaction log.

According to another aspect, the filesystem includes an allocator module; the method further comprising arranging by the allocator module storage space on each of the computer readable media into a plurality of containers, wherein each container comprises regions of sequential ranges on the media.

According to another aspect, the I/O cache module creates a plurality of cache structures mapped to one or more containers on the first computer readable medium, and the storage cache module creates a plurality of cache structures mapped to one or more containers on the second computer readable medium; the journaling module maintaining a persistent transaction log and providing for the recovery of I/O operations in the event of a failed operation.

According to another aspect, the first computer readable medium comprises DRAM and the second computer readable medium comprises a solid-state drive.

According to another aspect, each of the partitions is implemented in the kernel space of a computer system.

According to another embodiment of the invention, there is provided a caching apparatus in the input/output (I/O) path of a computer system having at least one storage device in network communication with at least one computer processor comprising (a) a block-based kernel-level filesystem, (b) an I/O cache module controlling an I/O cache implemented on a first computer readable medium, (c) a journaling module, (d) a storage cache module controlling a storage cache implemented on a second computer readable medium, the second computer readable medium having a lower read/write speed than the first computer readable medium; wherein the filesystem converts a file I/O request made by an application executed by the at least one computer processor into a block I/O request.

According to one aspect of the second embodiment, the I/O cache module determines if the block being requested is in the I/O cache; and upon a condition in which the block being requested is in the I/O cache, the block request is fulfilled from the I/O cache; upon a condition in which the block being requested is not in the I/O cache, the storage cache module determines if the block being requested is in the storage cache, and; and upon a condition in which the block being requested is in the storage cache, the block request is fulfilled from the storage cache.

According to another aspect of the second embodiment, prior to the storage cache module determining, the journaling module logs the block I/O request.

According to another aspect of the second embodiment, the logging comprises logging in a persistent transaction log.

According to another aspect of the second embodiment, the filesystem includes an allocator module; the allocator module arranging storage space on each of the computer readable media into a plurality of containers, wherein each container comprises regions of sequential ranges on the media.

According to another aspect of the second embodiment, the I/O cache module creates a plurality of cache structures mapped to one or more containers on the first computer readable medium, and the storage cache module creates a plurality of cache structures mapped to one or more containers on the second computer readable medium; the journaling module maintaining a persistent transaction log and providing for the recovery of I/O operations in the event of a failed operation.

According to another aspect of the second embodiment, the first computer readable medium comprises DRAM and the second computer readable medium comprises a solid-state drive.

According to a third embodiment of the invention, there is provided a computer implemented method for eliminating input/output (I/O) interference in consolidated servers comprising partitioning the I/O path in the kernel-space of a computer system accessing the consolidated servers into (a) a block-based kernel-level filesystem, (b) an I/O cache module controlling an I/O cache implemented on a first computer readable medium, (c) a journaling module, (d) a storage cache module controlling a storage cache implemented on a second computer readable medium, the second computer readable medium having a lower read/write speed than the first computer readable medium.

BRIEF DESCRIPTION OF THE FIGURES

FIG. 16 is a flowchart showing a method according to the invention.

DETAILED DESCRIPTION

The invention provides for a method by which the storage input/output (I/O) path in a system that includes one or more storage devices locally attached or in network communication with a computer system can be configured such that the I/O path is partitioned to use resources available in the I/O path more efficiently. In particular, the I/O path is partitioned using existing resources into a block-based filesystem, a partitioned I/O cache, a partitioned journaling mechanism and a partitioned storage cache. Details of each of this, and their interrelation will be discussed in detail below. While the invention is applicable to all computer systems having an I/O path, benefits of the architecture of the invention are particularly evident in consolidated server implementations where there exists a single I/O path between applications executed by one or more processors of a computer system and consolidated storage resources accessed by the computer system, locally or over a network.

Figure 1:
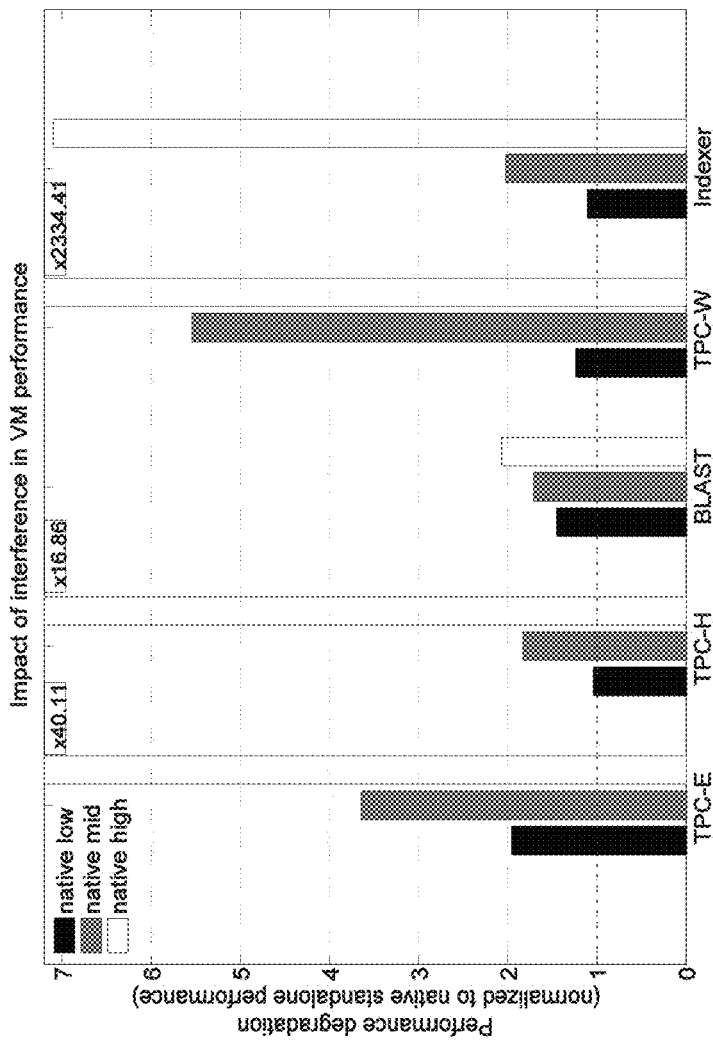
FIG. 1 shows results of performance degradation testing of a variety of datacentric workloads.
Figure 2:
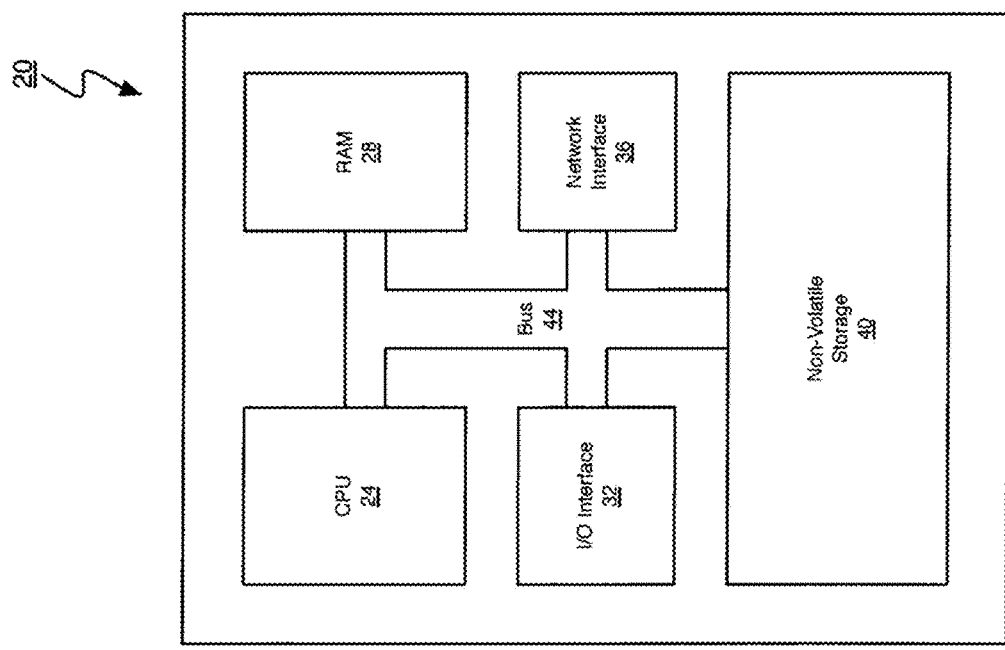
FIG. 2 shows one example of a system architecture for implementing an embodiment of the invention.

The various embodiments of the invention may be implemented in a general computer system, or in a network of computer systems comprising two or more general computer systems. The invention generally operates within the context of a computer system, and serves to provide an improvement to the data storage capabilities available to general known computer systems, an exemplary one of which is shown in FIG. 2. As shown, the computer system 20 has a number of physical and logical components, including a central processing unit ("CPU") 24, random access memory ("RAM") 28, an input/output ("I/O") interface 32, a network interface 36, non-volatile storage 40, and a local bus or other interconnect 44 enabling the CPU 24 to communicate with the other components. The CPU 24 executes an operating system and a number of software systems. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems. Non-volatile storage 40 stores the operating system and programs. During operation of the computer system 20, the operating system, the programs, and the data may be retrieved from the non-volatile storage 40 and placed in RAM 28 to facilitate execution. In addition, network-based consolidated non-volatile storage also contains data that may be retrieved by applications operated by the computer system. The general computer system is shown for illustrative purposes only, and it will be understood that the invention may equally be applied to any computer system.

In developing the invention, it was first determined to quantify the extent of performance degradation for a variety of workloads running within virtual machines (VM) on a Linux-based consolidated server. It was discovered that server performance degradation due to shared resources is quite severe, although VMs isolate the use of guest memory and CPU resources across workloads. Sharing of the common I/O path in the hypervisor and the devices results in non-deterministic behavior and performance degradation.

Next, a design and implementation scheme for partitioning the I/O path to reduce interference is discussed. The I/O software stack according to the invention encompasses a kernel-level file system, a DRAM-based I/O cache, a journaling mechanism, and an SSD cache that collectively partitions the resources in the Linux kernel and still provides a common I/O path over the storage devices. The approach of the invention supports dedicating slices of the I/O path for each of the competing workloads, unlike cgroups that rely on per-process resource consumption accounting and throttling controls. Slices are currently associated to a set of files or blocks, e.g. a directory. Slices can be created and destroyed dynamically, using the available resources in a server. The resources assigned to each slice cannot be used by other slices until they are released. Slices include dedicated space in the DRAM cache, the SSD cache, and private buffers and structures in the full path from the file system to the devices. Slices are defined simply by specifying the amount of DRAM and SSD cache space. The Linux prototype designed, and tested below, runs commercial-grade workloads and we observe how the system operates with and without partitioning. In our evaluation we focus on virtualized servers and partition the I/O path at the virtualization host. We examine transactional, streaming, and analytical processing workloads that are typically used today. Besides examining application-level metrics, we also use a system-level metric, cycles per I/O, to illustrate differences between alternative resource consumption controls. This metric has significant negative correlation with the observed application-level performance, i.e. better application-level performance goes together with lower cost per I/O issued by the application.

Overall, it is shown:
that I/O interference across independent workloads is an important problem in modern servers and can degrade performance many times compared to running workloads in isolation.
how partitioning the I/O path can be designed and implemented in modern Linux server
systems without violating legacy I/O semantics, and we provide a working prototype that is able to run commercial-grade workloads.
that partitioning can significantly reduce workload interference in servers and real-life data-centric workloads.

Figure 3:
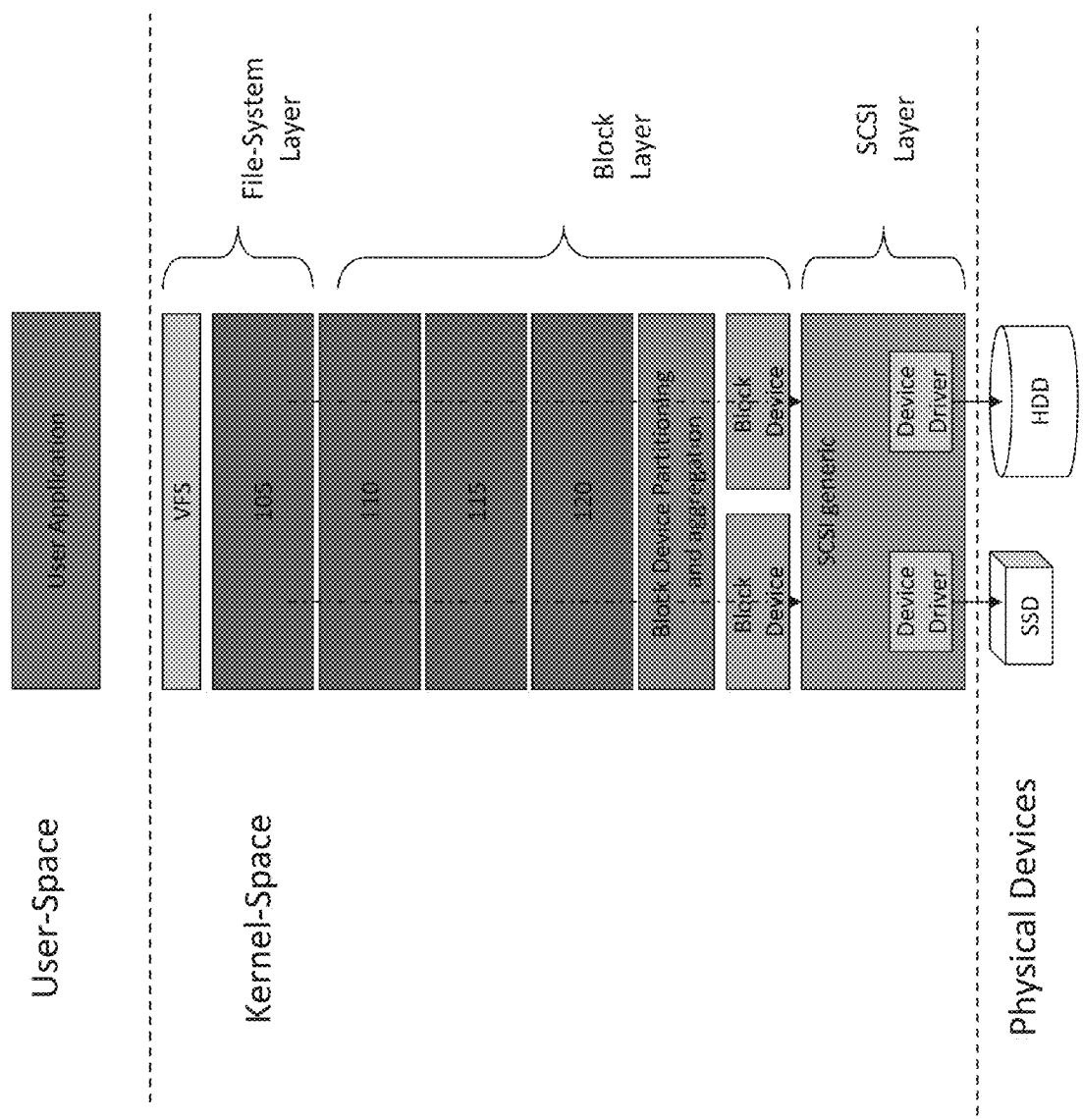
FIG. 3 shows a system according to one embodiment of the invention.
Figure 4:
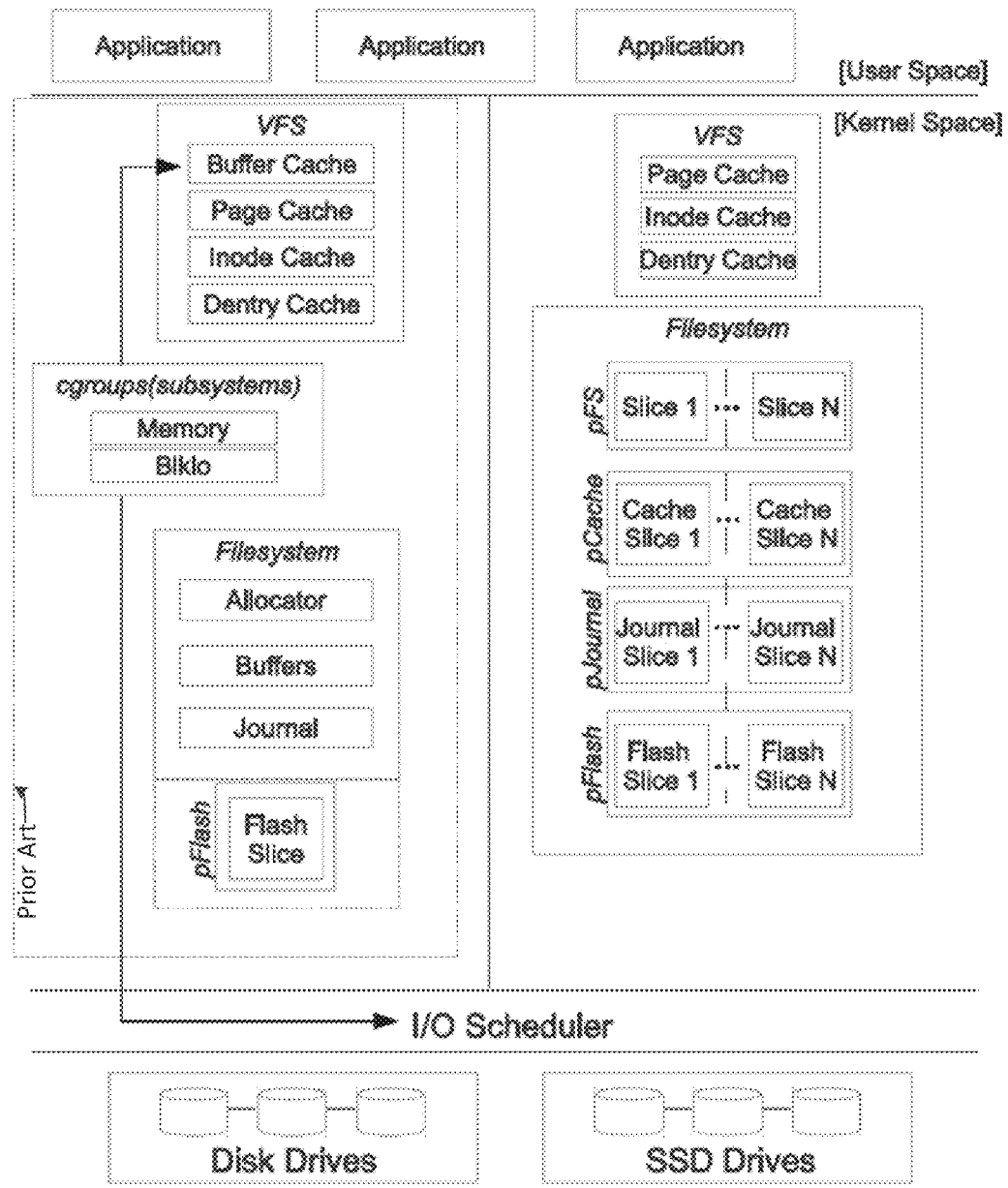
FIG. 4 shows the system of FIG. 3 in comparison with prior art systems.

In the exemplary embodiment, illustrated generally in FIG. 3, the partitioning approach covers the I/O path from the filesystem to the storage devices. To achieve this, we design and implement a custom filesystem 105, referred to herein as a block-based kernel-level filesystem, that dispatches requests to I/O slices and provides basic namespace management. An I/O slice handles part of the logical block addresses by using dedicated resources and structures. A partitioned I/O cache 110 preferably implemented in DRAM using an I/O cache module is provided, as is a partitioned journaling module 115 and a partitioned storage cache 120, preferably implemented by a storage cache module using an SSD. Other general aspects of the system that interact with the invention are shown and labeled in FIG. 3. FIG. 4 shows a comparison of an existing arrangement, on the left and the arrangement of the invention, on the right. pFS refers to the block-based filesystem 105 of FIG. 3, pCache refers to the I/O cache 110, pJournal refers to the journaling module 115 and pFlash refers to the storage cache 120. These terms are used interchangeably throughout the description.

Table 1, below provides an overview of the design, listing the thread-safe data structures and execution contexts involved in each layer of one embodiment of the invention. The following information is listed for each data structure: function, data structure type, number of instances, and persistence. For each execution context, an identification is provided of the type of context, as well as the number of instances and placement.

TABLE 1

Data structures and execution contexts for the layers of the IO slices partitioned I/O stack.

| LAYER | DATA STRUCTURES (protected/thread-safe) | | | | EXECUTION CONTEXTS | |
|---|---|---|---|---|---|---|
| | function | structure | instances | stored | function | instances |
| pFlash | block map | hash-table | per slice | MEM | request thread | per slice/CPU core |
| | element dependencies | array | per slice | MEM | block device completion | software interrupt |

TABLE 1-continued

Data structures and execution contexts for the layers of the IO slices partitioned I/O stack.

| | | DATA STRUCTURES (protected/thread-safe) | | | EXECUTION CONTEXTS | |
|---|---|---|---|---|---|---|
| LAYER | function | structure | instances | stored | function | instances |
| pJournal | transaction FIFO | circular array | per slice | DISK | application thread | inline |
| | transaction buffer | singly-linked list | per slice | MEM | log write-back thread | per slice |
| | block map | hash-table | per slice | MEM | block-device completion | software interrupt |
| pCache | block map | hash table | per slice | MEM | application thread | inline |
| | | | | | pipeline thread | per slice |
| | memory pool | stack | per slice | MEM | evictor thread | per slice |
| | | | per NUMA | | device completion, Top-Half | software interrupt |
| | | | per CPU | | device completion Bottom-Half workqueue | per slice |
| pFS | slice map | array | 1 | MEM/DISK | application thread | inline |
| | container | block allocator | depends on disk space | DISK | | |
| | container list | singly-linked list | per slice | MEM/DISK | | |
| | container-class list | singly-linked list | per slice/class | MEM/DISK | | |
| | VFS mode cache | Linux structure | 1 | MEM | | |
| | block map | array | per inode | MEM/DISK | | |

FIG. 16 shows a method according to the invention, in which an incoming file I/O request is received by the filesystem of the invention. At step 1600, the filesystem translates the file I/O into a block I/O, and identifies the appropriate partition at step 1605. Then, at step 1610, the I/O caching module determines if the I/O request can be served from the faster memory, such as DRAM. If so, the request is served at step 1615, if not, the journaling module ensures recovery of the I/O operation is possible and logs the I/O request at step 1620. The storage cache module then determines at step 1625 if the I/O request can be served from the SSD storage device, and if so, the I/O process is completed at step 1630. If not, a new I/O request is issued at step 1635, to fulfill the read from outside of the cache arrangement. Each of these elements will be discussed in more detail below, where exemplary implementations of each of the modules and elements of the invention will be discussed in further detail.

Filesystem

The block-based filesystem 105 includes an allocator module that organizes device space in regions of sequential ranges, each of which is called a container. Each container provides allocation and deallocation services of extents (integer multiples of blocks). The allocator module assigns containers to slices. A simple assignment policy may be used, such as mapping each top-level directory and its contents to one slice in a round-robin manner.

A typical filesystem implements functionality in namespace management, reliability, block allocation, and DRAM caching. Namespace management provides a mapping between a filename and the content of the file. Hierarchical directories are also provided to group files. Namespace management requires extensive use of metadata that defines, for example, unique numerical identifiers, pointers to allocated blocks, disk usage of the file, file length, file permissions and timestamps. A binding (d-entries) is created between a filename and the directory to which the file belongs. Finally, a superblock contains general information about the filesystem. Filesystems also provide a reliability mechanism to keep a consistent state of the machine even in the presence of power failures or system crashes. Filesystem operations allocate and free disk blocks, so there is a need to keep track of unused blocks on the block storage device underlying the filesystem. Finally, storage devices throughput is orders of magnitude slower than the CPU, making it imperative to rely on caching recently accessed blocks in DRAM to increase filesystem performance.

The filesystem of the present invention is designed to implement the minimum required functionality for a filesystem to be functional. Only namespace management is implemented in the filesystem layer, and the remaining functionality is provided by other layers, as was illustrated in FIG. 3. Block allocation is handled via calls to a dedicated allocator module.

Generally, the block-based filesystem performs namespace management and translated file operations to block operations. The resulting block operations are issued to the next layer (discussed below) taking into account the partitioned cache design. Essentially, this demultiplexing of block requests is a mapping between request addresses and partition queues.

Figure 5:
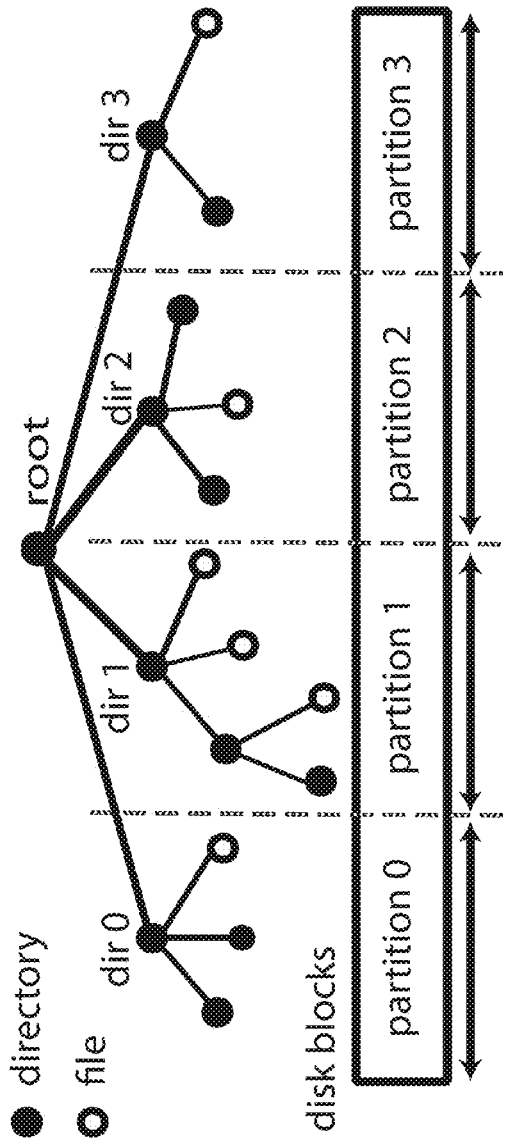
FIG. 5 shows an assignment of directories and files to partitions according to invention.

The disk layout of the filesystem is shown in FIG. 5. For simplicity reasons, there are no metadata and data zones. Data and metadata are spread across the address space. The only constraint is that the first block of the disk is the super block of the filesystem where vital filesystem information is maintained. In collaboration with the allocator module, there can be redundant copies of the superblock, in reserved locations across the address space of the block device underlying the filesystem.

The allocator function is centered around the concept of containers. A container, as herein defined, is a contiguously allocated fixed-size space on a device. A container resides on a single logical device and does not span devices. A physical device is initialized during allocator initialization. The initialization writes metadata for that device so that containers can be created on demand. Higher layers which use the services of a container need to use a handle to the device that the container will be allocated from. The handle is a structure that consists of a file descriptor for the opened device, a pointer to in-memory metadata for the opened device and the name of the device.

Figure 6:
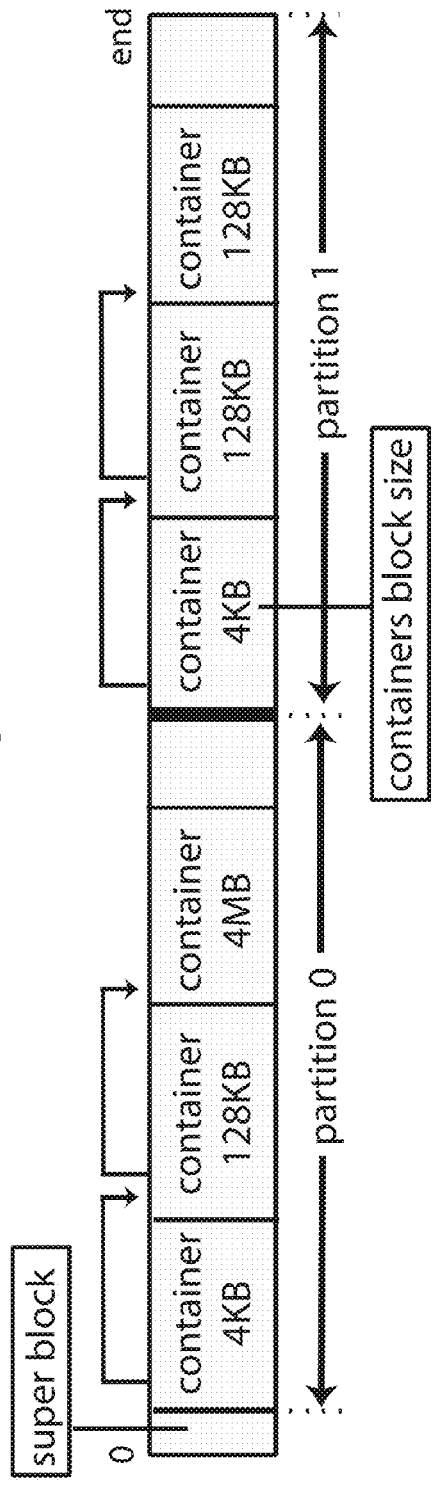
FIG. 6 shows how partitions consist of multiple containers of different allocation unit (AU) sizes according to invention.

To create a container, a client needs to have the handle of the opened device, block size of the container, and number of blocks. The client allocates the next available container id, updates the size, its physical offset, calculates available user blocks, free blocks, bitmap blocks, updates the disk metadata, and flushes the data on the disk. An example of a container is shown in FIG. 6.

When a device is opened, it checks if it has been already opened before. If not, the device metadata and the container metadata are loaded in memory. Otherwise, the handle for the device already points to existing metadata in memory. In this case, a reference count is used to keep track of how many times a device has been opened. Closing the device decrements the corresponding reference count. The shutdown of the system flushes all in-memory metadata for the disk and containers to the disk. To read/write from a container, a client passes as an argument, the handle to the device, container id, logical block number in the container, number of blocks to be read/written and a pre-allocated buffer.

The allocator finds free blocks on the physical storage to store the data for the container. For systems under intense I/O loads, an allocator can become a bottleneck in the performance even if sufficient persistent storage is available. Quickly searching and allocating the desired space is hence important. Implementing this quick searching and allocation will now be discussed.

For a newly created container, a bit for each available block is allocated and marked as free. The bitmaps are physically stored just after the container's metadata. Also, an in-memory copy of the bitmap is used for batching small updates and serving reads without I/O accesses. The cost of memory and physical storage is low so there is a negligible overhead for such an arrangement. For a container with 64 Kbytes of block size, 1 bit represents 64 Kbytes of physical storage. This results in a 2-MByte bitmap for every 1 TByte of physical storage. Therefore, it is possible to practically store the complete bitmap of a container in memory for faster access.

Over time, containers will suffer fragmentation, and locating the desired amount of consecutive physical space implies parsing through the entire bitmap. To overcome this limitation, we maintain in memory lists of blocks that have been recently freed. The list of blocks is ordered by the size of its free blocks. A new container has initially an empty list. Over a period of allocation and free operations, the list grows. The organization of the list aims at reducing the cost of the allocate operation that is in the critical path. The free list is persistent and is placed on the device after the allocator bitmap. The free list is reconstructed at boot time from its persistent incarnation.

The filesystem preferably uses a transactional API provided by the journaling module, discussed below, to ensure filesystem structure consistency in the event of failure by using write-ahead logging. Sync operations are directed to the corresponding I/O cache module slice that implements the flushing functionality for individual cached blocks of an outstanding I/O request, and for every cached block of a target file.

Figure 7:
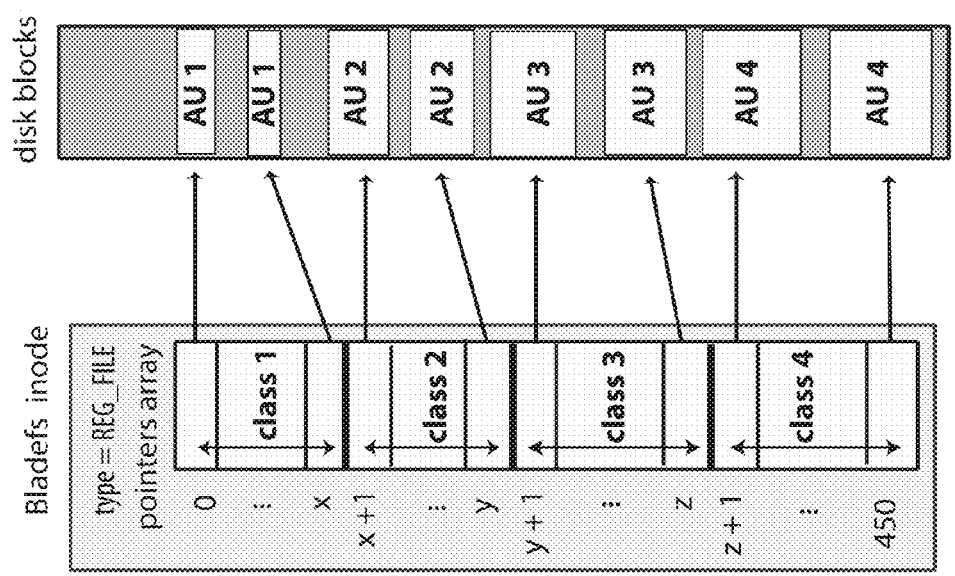
FIG. 7 shows an outline of the inode structure for the filesystem of the invention.

Both files and directories in k0fs are described by an inode. FIG. 7 illustrates the format of the k0fs inode. The inode contains the following fields. inode number is a unique number per inode that identifies each inode. Owners holds user and group identifiers of the owners of this file or directory and their access permissions. This allows the file system to correctly manage accesses and implement file-level protection. Size holds the file length in bytes, which in k0fs is typically different than the actual allocated size (due to pre-allocation). Timestamps maintain the time of creation, last access, and last modification of the inode. The type field is being used to differentiate if the inode is being used for a file, directory, symbolic, or hard link. The links field holds the number of files that actual point to this inode, and is being used to implement hard links.

The inode contains pointers to data blocks categorized into classes. Each class holds pointers to different size of data block. As the file size increases, filesystem starts using higher class pointers (pointers to larger data blocks), which results in a single pointer covering a larger part of the file. This approach reduces the number of pointers required for large files. In addition, this design reduces the fragmentation of inode contents. Conversely, for small files (a few Kbytes) filesystem uses only direct pointers of lower class that point to small blocks, and thus there is no need to allocate large areas of the device to the file. Finally, to allow scaling to very large file sizes, filesystem reserves a pointer to a block that may contain indirect pointers to data blocks of more classes.

Files are implemented using inodes. We choose to have large inodes of 4K to allow large amount of pointers to be stored in data blocks. This has the advantage of using only direct pointers from within the file inode to access hundreds of GBytes within a single file, without the need to first access indirect pointers (that require an addition I/O).

Figure 8:
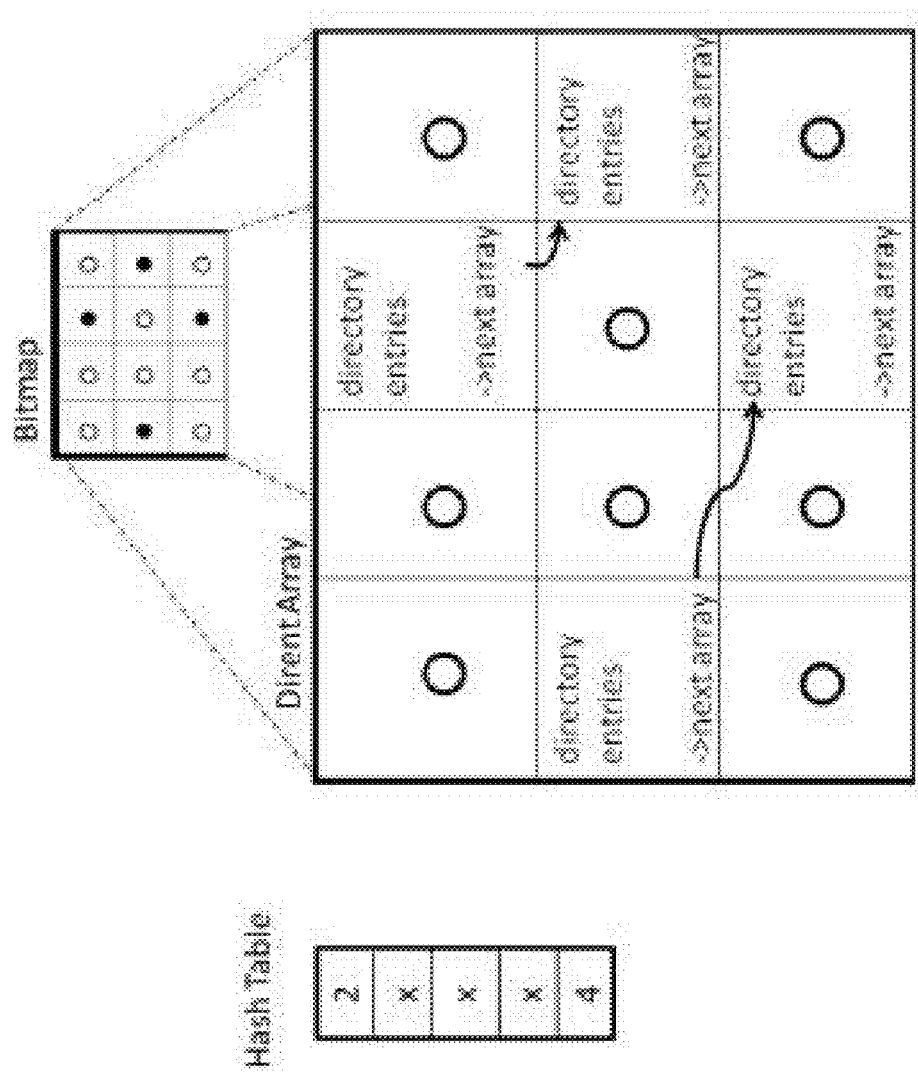
FIG. 8 shows a directory hash table for use with the filesystem of the invention.

Directories are implemented on top of files, making use of a data structure that supports the following operations: insert( ), lookup( ), delete( ), is-empty( ), list-all-entries( ). There are several options for such a data structure, such as B-Trees and hash tables. Aspects that have to be considered in the design of directories are the ability to expand as the number of entries in the directory increases, and also the time/space complexity of the operations that are needed. B-Trees have the ability to expand and their worst-case cost is logarithmic for the most common operations with respect to the number of stored elements. The main disadvantage of B-Trees is the complexity to implement them using fixed-size disk blocks. On the other hand, a hash table is easier to implement and in the case of an appropriate hash function we expect better amortized behavior than a B-Tree. One major disadvantage of hash tables is their ability to expand. There are alternative techniques, such as extensible hashing, but they require implementing a tree for the bucket lookup that would not be efficient in our case. In our design, and targeting specific workloads, we construct an array of hash tables, where each table holds a fixed number of elements. FIG. 8 illustrates the design of an entry in the hash table array.

There are three main parts in the hash table implementation: the hash table itself, the dirent array and the bitmap. Each bucket of the hash table holds references to the dirent array that are used to store the directory entries. Bitmap is being used as an allocator for the dirent array. Each entry in the directory entries array keeps an array of directory entries and a pointer to the next directory entries array that is being used to expand the buckets list. A directory entry consists of the name of the directory, the inode number that the directory entry refers to, and the type of the inode. In the following subsection we will explain the semantic of operations in the above Hash Table, also illustrated in FIG. 8.

Filesystem operations in the kernel are divided in three main categories: file operations, inode operations, and superblock operations. Since many of these operations are found across filesystems, the linux kernel has evolved over time and abstracts part of these operations in a separate layer, the virtual file system (vfs). VFS is the top-most layer in the file I/O path, and all applications requests that enter the kernel first go through the VFS. Then, VFS makes calls via a defined (but complex) API code that is provided by individual file systems. So most of the file system operations are initiated in VFS but their interaction with the storage devices is actually handled by each file system. VFS also takes care of inode and dentry caching, since this is a common part for file systems. Although it is possible to implement filesystems that do not integrate in VFS, this would result in the filesystem not being transparent to users and applications, e.g. it would require a specialized interface from user space for mounting and accessing. Our filesystem has been designed and is implemented to integrate within VFS, which is a challenge on its own, given the complexity of the VFS API and semantics.

I/O Caching Module (pCache)

The I/O cache as implemented by the I/O caching module supports multiple independent caches over a shared pool of buffers, with a hash table per cache instance. Each hash table consists of double-linked bucket lists and each entry contains a packed array of elements. An element describes a page-sized buffer and contains an atomic reference counter, flags, and a timestamp. The cache is fully set-associative and implements a timestampbased LRU approximation for replacement. The cache supports both write back and write through functionality.

Each cache instance is supported mainly by two threads: The pipeline thread, which is responsible for processing cache requests and the evictor thread that implements the replacement policy. For cache misses, the request processing is handled by the pipeline thread. For cache hits, context switch overheads are not acceptable for I/O requests that result in DRAM cache hits, which are expected to be as fast as a memory copy. In this case, the application's I/O issuing user-space thread context is used (inlining), to avoid the penalty of two context switches (back-and-forth) between the application context and the pipeline thread. The evictor thread is responsible for both flushing dirty elements and keeping the cache within user-specified size limits.

The I/O cache module allows the creation of multiple caches with variable size elements mapped to disk ranges. Elements can be between a few Bytes and 4 Kbytes in size. Elements are packed transparently on the disk and unpacked by the cache when the user needs them. Accessing data through a cache is done by using the element's index and tag, and the cache manages all I/O in the case of a miss.

Two threads per cache are used: a pipeline thread that handles requests, and an evictor thread that evicts elements from the cache. Scaling performance while limiting contention happens via the use of multiple independent caches, which each store and handle a disjoined set of data blocks. It is important to note that blocks from a single workload or file can span caches, since there is no restriction on the mapping of blocks to caches. Although a single cache could use more than two threads to scale its performance, we believe that given the increasing size of data being accessed by applications, a better approach is to increase the number of caches, which can be seen as providing a single cache in many slices. Also, this avoids additional context switches among cache threads that eventually increase system overhead.

The cache uses mostly write back fully associative design with a time-stamp based approximate LRU. Write-back is always used for data blocks. However, metadata blocks need to be transferred directly to the journal device to ensure correct ordering during recovery. For this reason, metadata blocks (or anyblock that needs to be journaled), is sent to the journaling module in write-through mode. It is important to note though, that this write-through does not require writing the block to the actual device, but simply writing it to the internal DRAM buffers of the journal. Its purpose is to only maintain ordering and not to make the block stable to persistent storage.

An LRU approximation with time stamps is used to avoid maintaining an exact LRU list and the associated locks. Our approach trades accuracy for using only atomic operations on reference counts and timestamps rather than locks.

The cache structure is implemented with a hash table of bucket lists. Each bucket list is protected by fine grain locks. The cache packs elements in 4 Kbyte extents and maintains metadata per extent. The interaction of the cache with the actual I/O device occurs on the base of extents, regardless of the size of cached objects (elements).

Evictor Thread

The evictor thread is responsible for flushing dirty data to the disk and evicting CacheElements when the cache gets full. When the cache reaches a preset threshold the evictor thread is woken up. The evictor begins scanning the hash table for elements that are not in use and are valid. When such an element is found, if it is not dirty, it is evicted.

If the element is dirty it is marked as invalid and is placed on a list of elements that are to be flushed to the disk. The evictor then searches neighboring Elements to see if they have to be flushed and adds them to the flush list. This is done to send big requests to the disk for performance reasons. When no more neighboring elements can be flushed the entire flush list is send as a single request with a callback and the evictor continues scanning the hash table for more elements if necessary.

When the flush callback is called it scans all flushed elements. If an element has been requested, then the element is not evicted and is made valid, otherwise it is evicted and its resources are returned to the system.

Pipeline Thread

The pipeline thread consists of four stages (states), New, stalled, Conflict, Exec, each operating on requests that are in a certain state. Each stage has a queue of requests waiting to be served. Stages are run in a round-robin fashion. A request can be in at most one queue at any point in time. The four stages are as follows:

New Stage: This is the first stage for all requests and it performs all lookups for the elements (e.g. blocks) of each request. Depending on the hit/miss cases it will move the request to one of the other stage's queues.

Conflict: This queue has requests containing elements that resulted in hit under miss or hit under eviction.

Stalled: This queue has requests containing elements that were a miss, and they could not be given a data buffer.

Exec: This is the final stage for all requests. It will remove requests from its queue and run the user-supplied handler. Upon completion it will also free the request.

New Stage:

The new stage begins by looking up each element of each request. If an element lookup hits in the cache, we do a memory copy between the cache's internal buffer and the user supplied buffer1. A per-request completion counter is increased. It can happen that an element is a hit but the element is not yet valid. Such cases occur when the element is fetched from the disk or when it is flushed to disk. In these cases the request is marked as "conflict". When the element lookup results in a miss then a new element must be allocated. An invalid element is allocated without a buffer and inserted in the cache with a reference count one. This allows serving miss-under-hit scenarios and avoiding unnecessary eviction of the element. Then it attempts to allocate a buffer page for the data. This allocation may fail if the cache is full. If the allocation succeeds, then depending on the direction of the request different actions will happen. If the request is a read, then the cache generates an I/O request to the disk to fetch the element's data.

When the IO request finishes, the callback will mark the element as valid. It will also pass the data (copy or use of the get/put interface) between the allocated buffer and the user buffer, and also decrease the element's reference counter as well as increase the request's completion counter. If the request is a write, a copy between the allocated buffer and the user-supplied buffer will suffice, and the element will be marked as dirty and valid. The request counter will be increased as well. If the buffer page allocation fails, the request is marked as stalled.

When the iteration of elements in a request is finished, the request is moved to the Exec queue if all elements have been completed. Otherwise, if the request is marked as stalled, it is moved to the stalled queue (only marked as conflict).

Stalled Stage:

The stalled stage allocates data buffers to elements that could not be allocated when served by the new stage. The stage searches the elements of the first request in its queue. When an invalid element with no data buffer page is found a new buffer page is allocated. The allocation can also fail if the cache is full just like in the new stage. If this happens, the pipeline moves to the next stage.

If the allocation succeeds and the request was a write then we do a copy between the user provided buffer, and the allocated buffer to fill the element's buffer, the element is marked as valid, and the request completion counter is increased. If it was a read, then an I/O request is send to the disk. This fills the element's buffer with valid data and the callback marks the element as valid. Then we pass data between the user buffer and element's buffer, and increase the request's completion counter. When all elements have been assigned data buffers if the request is marked as conflict and we continue to the next request in the queue. If the request was completed then it is moved to the exec queue.

Conflict Stage:

The conflict stage is responsible for completing requests with hit-under-miss or hit-under-evict elements. The stage iterates its queue. For each request it scans all its elements. When it finds a valid element that has not been yet completed, it does the necessary copy and increases the requests completion counter. Since it handles only hits there is no need for any I/O from this stage. When a request completes, it is moved to the exec queue. If a request is not yet completed, it remains in the queue.

Exec stage: This is the final stage that removes requests from its queue and simply runs the provided handler function. Finally, the request descriptor is freed.

Journaling Module

The journal module supports pFS in implementing atomic operation sequences with all-or-nothing semantics for persistence. It supports multiple slices, where each slice is assigned a device range for the transaction log and the corresponding device slice allocated by pFS for filesystem data. Transactions are accelerated by an in-memory transaction buffer that mirrors the active part of the transaction log on disk. This buffer allows us to avoid reading the transaction log for journal cleanup, and also to merge transactions.

Read operations are served directly from the underlying device slice, unless the data blocks (filesystem metadata) are found in the transaction buffer of pJournal. Lookup operations on the transaction buffer are served by a hash-table in-memory structure. The handling of metadata writes is more complex, as we need to preserve atomicity. First, we copy the buffers from the I/O request into the in-memory transaction buffers. Subsequently, the data from transactions which are marked as ended are written to the transaction log. Several transactions are grouped together, and served as one batch. The batching results in large writes to the transaction log. Having the data in the persistent transaction log allows for replay of completed transactions to recover from failures. The writes to the transaction log are performed by a separate thread (one for each slice of pJournal). This thread finally issues the original write requests to the device slice.

Transaction identifiers are unique across all instances of pJournal. An atomic counter, shared across journal instances, provides the next transaction identifier. A coordination protocol ensures filesystem consistency for transactions that span across instances, by making all-or nothing updates to the persistent state of the filesystem. An example is the procedure of moving a top-level directory from one slice to another.

To better understand how our journal operates and the motivation behind our design and implementation we first discuss how journaling happens today. Achieving recovery has traditionally been the role of the filesystem. First, most systems today only guarantee recovery of the metadata in the storage subsystem, and only the filesystem maintains metadata (the block layer and all layers below the block layer are typically stateless or use brute-force approaches, such as NVRAM to guarantee persistence of small amounts of metadata).

Today, file-level recovery although still the predominant approach, is becoming a concern. First, other layers in the I/O path are starting to employ extensive metadata, for which brute force approaches, e.g. NVRAM are not practical. These layers are required to build their own approach to recovery since it is not possible to use a mechanism embedded in the filesystem. Second, file-level recovery tends to be intertwined with caching and other operations in the filesystem, making extensions to the common, performance-oriented path in the filesystem a daunting task. Thus, in general there is merit to provide a generic recovery mechanism, outside the filesystem, that is usable by both filesystems and other components of the I/O path.

Providing recovery below the filesystem incurs two main challenges: Granularity of metadata and atomicity units.

As mentioned, today the main role of recovery is to ensure metadata consistency after a failure. Metadata are typically variable size, which requires writing to the log variable size objects and being able to understand the structure and semantics of these objects in a layer outside the filesystem. This essentially breaks the clean division of semantics and is one of the reasons that recovery is traditionally under the responsibility of the layer managing metadata.

To address this challenge, in our design we divide responsibilities in a different manner. We design a recovery layer that always operates on fixed size extends, similar to a block device. Then, we require each layer using the recovery mechanism, to break the clean division of semantics. This is one of the reasons why recovery is traditionally under the responsibility of the layer managing the metadata. This approach essentially transforms the recovery mechanism from an "operation journal" to a "data journal".

The second challenge is related to specifying which pieces of data that are sent to the journal belong to the same recovery unit (or atomicity interval). When recovery occurs in the filesystem, the filesystem itself specifies the consistency points at which the journal can recover after a failure. To achieve this, when recovery is moved outside the filesystem, there is a need to provide additional information across layer. For this purpose we provide a transactional-type API that marks the beginning and end of each atomicity interval, and adds a transaction identifier to each data block sent to the journal. The journal is then able to order requests and recover at the boundaries of full transactions, ensuring consistency.

Then, we create one journal over each partition of the storage space we care to recover and ensure that all traffic related to recovery passes through the journal.

There are two main options provided by our design that are necessitated by the need to mitigate the overhead of journaling. First, all data passing through the journal device are marked as data or metadata, which allows the user to configure the journal with different options for strength of recovery. Second, there is a tuneable parameter on how frequently transactions are made stable to persistent storage. This parameter essentially specifies the amount of batching the system can perform, which then impact the efficiency at which the journaling storage device operates.

Finally, the core implementation of our journal ensures certain properties, important for achieving high performance:

1. Each incoming request is completed as soon as it is written to a journal buffer in memory.
2. All operations from journal buffers to the journal on the disk are asynchronous, large writes. This ensures that journal writes incur the minimum possible overhead.
3. Reads from the journal for the purpose of transferring data in place on the device are performed in large sizes and asynchronously, which also ensures small impact on performance.
4. Finally, in-place writes are not possible to control in terms of size and location, however, they also occur asynchronously.
5. To ensure recovery the journal properly uses the equivalent of barrier and fence operations to ensure ordering of requests sent to the devices.

In this approach, all additional I/Os occur in large size and asynchronously, reducing the impact of recovery on I/O performance. The worst case however, remains for streaming workloads and the case where all data and metadata need to be journaled, where the I/O traffic increases by a factor of 2× (for each original I/O there is two additional I/Os one to write the journal, and one to read it later on for transferring the data in-place). To further improve this, our approach is amenable to a number of optimizations to reduce the number of I/Os.

Finally, a point that needs further attention is how we can achieve consistent recovery of multiple partitions, when using independent journals. For consistency, we use global transaction IDs. This means that all partitions in the system get the next transaction via a globally shared and atomically incremented counter, and that transaction begin and end markers appear in each journal for all transactions. This allows each journal to replay complete transactions from the log and to eliminate unfinished transactions during recovery (at mount time).

Data Path

Any I/O request follows a specific path depending if it is a write or read request. Both "reads" and "writes" are serialized to a work queue. There are three steps for the write requests:

1. Write the whole I/O to a circular buffer (memory).
2. Read the buffer and write to the journal.
3. Read the journal and write in place.

This means that every block can be found in one of three places: the memory buffer, the journal device or the device itself. Thus, on a read request we search the pages in these tree places. For this reason, a lookup structure is required, that will store information about the location of data in the module.

The read process is fairly simple. The lookup structure is consulted to find the location of each block separately. If all blocks are found in the device, a single read is issued to the device. If that is not the case, many read operations are issued (one per requested page, each on the corresponding partition, journal or core).

Writes fall in more cases, and they can either complete in the circular buffer in memory, go to the journal device, or directly in place:

1. Writing to the circular buffer (in-memory)

When a write request arrives, a header page that holds metadata about the write operation is created. The header plus each page from the I/O are copied to a circular buffer in order.

In the case of a full buffer (the I/O pages are more than the free ring pages), the copy is stalled until some space is freed. When the buffer is half full, the "log" thread wake up and starts writing data to the journal.

2. Writing to the journal device

The "log" thread reads the ring buffer "inflight" pages (pages that are to be copied) and issues as large (sequential) writes as possible.

As soon as a copy is complete the page is marked as free. The moment the journal is halved in space the "write-in-place" thread wakes up and begins the flashing in place.

3. Writing to the data device

The "write-in-place" thread flashes the data to the disk as follows. First, it reads the write operations in the journal, using headers. Consequently, each operation is forwarded to the device in place.

Journaling

All requests reaching the journal module are pushed in a work queue and handled by the "In-Flight thread". If it's a read request, the In-Flight thread consults a look up structure which contains information about the stored data location (the location, memory, journal, or core and the offset).

A write operation is typically part of transaction, containing a few writes. Apart from the normal write I/Os a transaction entails special signals that denote the start and the end of a transaction. Upon a write, all pages of the I/O plus a header page describing the I/O are copied to the memory buffer. The lookup structure is altered (a new entry for the corresponding journal blocks are inserted or older are updated). At that point the write operation is successful. Once the data blocks are copied in the memory buffer the system returns successful write to the requesting process.

Data is flashed to the journal when the memory buffer starts to fill up (based on a configurable threshold). The "in flight thread" wakes up the "log thread" and it starts filling the journal. The "log thread" flashes all valid pages of the ring buffer, updates the look up structure and sleeps consequently. Periodically, and after the flashing has finished, the journal's super block is updated with the new head and tail of the journal (checkpoint).

When the journal capacity is reduced, the "write-in-place" thread is waked up. Its role is to place data in the core partition. Hence, it checks which transactions are finished reads the matching operations from the journal and stores them to the core partition.

When using multiple journals, each partition is assigned its own memory buffer, journal partition and look up table; thus most work will be "local" in sense that the memory buffer the processor and maybe the drive used will be on the same context.

Recovery

Recovery can only be ensured if the super block is not corrupted. The super block contains the head and the tail of the journal. While performing a write request the head increases and always lands on a header. This header describes the first write operation that has not been transferred in place (with the exception the case where head equals tail and the journal is empty, which means we have no valid header). The tail always points to a block in journal where the next header will be stored. So in principle, the space between head and tail is the valid part of the journal. Data outside this area does not contain useful information. Recovery with these semantics is a fairly simple procedure that involves the following operations: 1) Read the super block, 2) Scan all the valid headers in the journal and store them in memory, and 3) Transfer the completed transactions in place.

Storage Caching

Servers today start to employ SSD caches in the I/O path. We use an SSD cache that is based on a block-device module that transparently caches disk data on SSDs. The address space of SSDs is invisible to layers on top.

However, instead of using multiple such SSD cache instances, in the present invention prior art sub-methods are extended to support multiple slices of the SSD storage space, one for each underlying storage device. The extended SSD cache, pFlash, can be configured to dynamically grow and shrink the SSD space allocated to each slice from a shared SSD device pool.

The main extension in pFlash is to use multiple internal structures, one for each slice, and pointing to blocks that belong to a single underlying storage device. Each slice has a user-defined upper limit for SSD storage space allocation. This limit can be changed dynamically. A slice can steal SSD blocks from another slice if it has not yet reached this limit and the other slice has exceeded its own limit. All cache block relocations between slices take place only when a live I/O request triggers a cache block replacement operation. Thus, changing the slice size limit incurs no overhead.

For each partition of the I/O stack, the following instances of our modules are in place: one allocator slice, one pCache slice, and one pJournal instance. For the pJournal instance, two instances of the pFlash are used for the core and journal space, respectively, for example. Since, aside from the above, storage caching is generally known in the art, and therefore not described herein in further detail Evaluation Platform We perform our evaluation on a server equipped with a dual-socket TYAN S7025 motherboard, two 4-core Intel Xeon 5620 64-bit processors with hyper-threading running at 2.4 GHz, 24 GB of DDR-III DRAM and four 32 GB enterprise-grade Intel X25-E SLC NAND Flash SSDs, each individually connected to one of four LSI MegaRAID SAS 9260-8i controllers. We also utilize twelve 500 GB Western Digital WD50001AALS-00L3B2 SATA-II disks connected to an Areca ARC-1680-IX-12 SAS/SATA storage controller and assembled in a hardware RAID-0 configuration.

The LSI controllers are connected to two I/O hubs allowing for a maximum read throughput of 1 GB/s and 640 MB/s write throughput. The SSDs are arranged in a RAID-0 configuration using the default and Linux driver, with a chunk-size of 128 KBytes. We create an SSD cache by using the two RAID-0 configurations mentioned above. We use CentOS Linux v. 6.3, with the 2.6.32-279.5.2.e16.x86 64 kernel. All native experiments that do not include our custom I/O stack use the xfs filesystem with a block-size of 4 KBytes. The I/O scheduler used in all experiments is noop elevator. We capture multiple system metrics at both the host and VM levels, including CPU and device information, filesystem statistics and performance counters using Linux utilities and sub-systems.

Workloads

TPC-H [19] is a data-warehousing benchmark, generating business analytics queries to a database of sales data. In our experiments, reported below, we execute query Q5 in a continuous loop, using a 6.5 GB database (4 GB dataset). This query accesses 85% of the database (5.5 GB) and generates an IOPS-intensive access pattern of 4 KByte reads, randomly distributed over the file-set comprising the database. The database server used in our TPC-H experiments is Postgr-eSQL v. 9.0.3. The metric reported for these experiments is the average execution time (in seconds) for twenty consecutive executions of query Q5.

TPC-E is an online transaction processing workload that emulates the operations of a stock broker. In our experiments, we have 24 concurrently executing transaction-issuing threads, over a 45 GB database. This workload consists of randomly distributed smallsized I/O accesses, 15% of which are writes. The database server used in our TPC-E experiments is MySQL v. 5.0.77. The metric reported for these experiments is the transaction rate (tps).

TPC-W is an online transaction processing workload that emulates the operations of an online shop. In our experiments we run the order taking profile with 2000 emulated clients. With this profile, 50% of the client sessions include shopping-cart updates. The database size is around 3 GB. Most of the device I/O activity comes from synchronous writes (flushes) of the database log. The database server used in our TPC-W experiments is PostgreSQL v. 9.0.3. Two metrics are reported for these experiments: transactions per second (tps) and average transaction response time (ms).

Psearchy discloses a file indexer that uses multiple threads. Each thread picks files from a shared queue of file names and maintains a hash table for storing file hashes in memory. These hash tables are flushed to storage when they reach a user defined threshold. Psearchy generates mostly sequential reads for scanning each of the files. We run Psearchy with 8 threads over a 10 GB file-set consisting of 968 files with a size of 10 MBytes each, organized in 176 directories. The metric originally reported by Psearchy is the job completion rate in files processed per second; for simplicity, we report the average execution time in seconds for six consecutive executions.

BLAST is an application from the domain of comparative genomics. In our configuration we use the blastn program (version 2.2.27) which performs a nucleotide query on a nucleotide database. Sixteen instances of blastn run simultaneously, where each instance issues a separate query on a separate database. This is a realistic scenario for facilities hosting genomic data as typically queries are submitted by clients located remotely. We use a 23 GB dataset that consists of multiple nucleotide databases (nt[00..11],env nt[00..02]) and a genomic database (refseq genomic). The metric reported is the average execution time (in seconds) over six consecutive executions.

For workloads that involve iterations (BLAST, TPCH, Psearchy) over the dataset, in order to measure steady state performance rather than cold cache misses, we discard the first iteration. For the rest (TPC-E, TPC-W) we have a ramp-up period of 6 minutes.

Along with absolute application performance results we present the cpio metric, which shows the CPU cycles needed for completing an application level I/O request. In other words, lower scores should translate to better application performance. We show that there is a strong negative correlation between this metric and application performance. Configurations with good performance are characterized by lower cpio values for the production VM and correspondingly, high cpio values for the noise VM. In the context of interference, we expect an effective mechanism to keep the cpio metric for the target workload steady across noise levels. In our results section we show that the trade-off in cpio between the noise and production VMs is significantly different between our mechanism and cgroups. The cpio metric is calculated by dividing the CPU cycles for each VM, reported by the perf tool on the host side, to the number of read/write system calls that the application issued towards the file-system inside that VM.

Comparisons are also made against cgroups, the existing Linux tool discussed earlier.

Experimental Results

Figure 9:
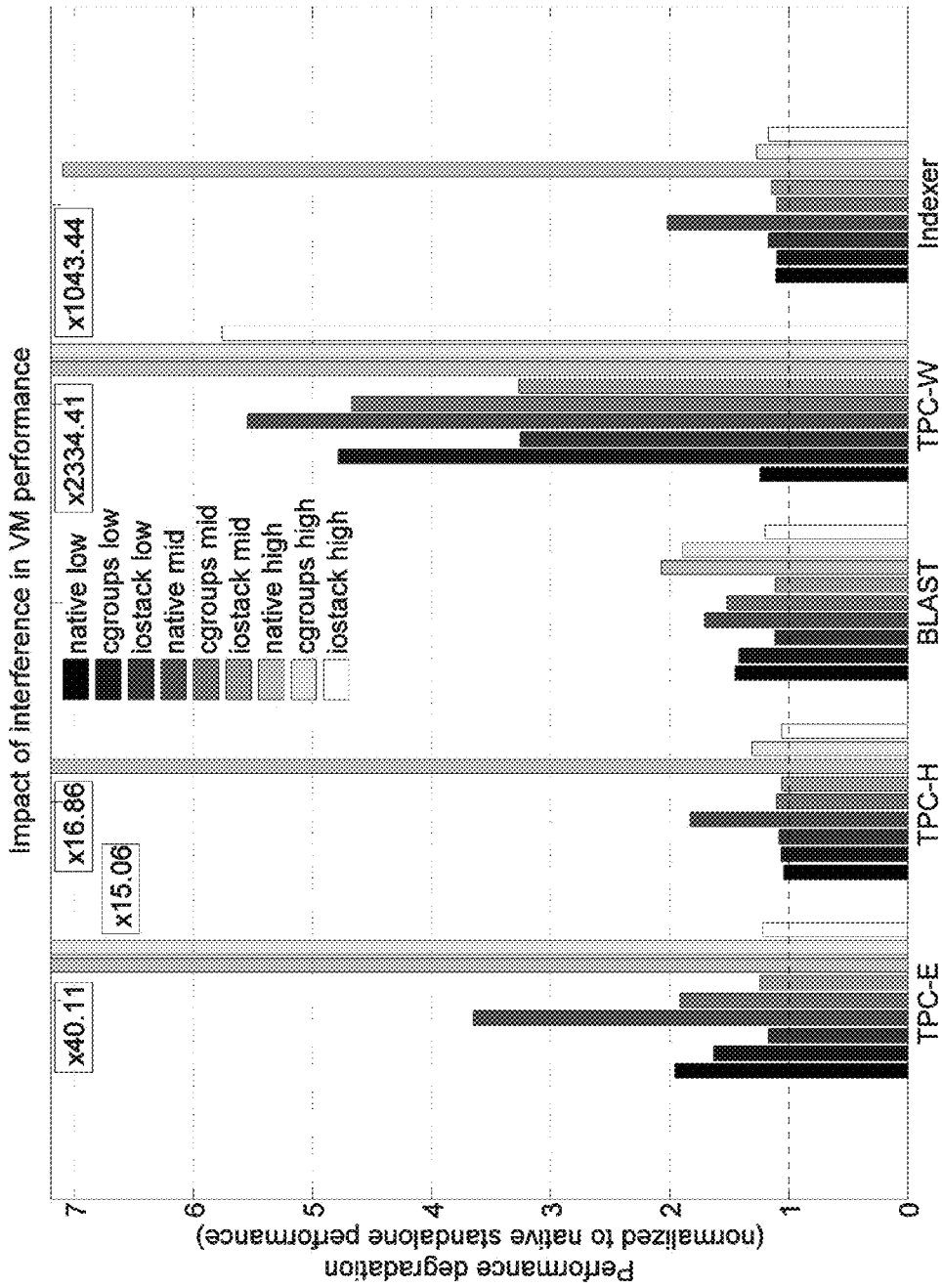
FIG. 9 is a graph showing the effectiveness of the invention in minimizing performance interference.

FIG. 9 summarizes our evaluation results for the effectiveness of the invention for three noise settings. For the native, unregulated configuration we observe that performance degradation can be as high as 40× for TPC-E when looking at the transaction rate. For TPC-W, performance degradation can be as high as three orders of magnitude over the nominal case when looking at the average transaction latency. With cgroups, performance degradation is reduced to more than half as compared to the unregulated configurations, but at high noise settings still remains as high as 15× for TPC-E and three orders of magnitude over the nominal case for TPC-W.

With the method and system of the invention we achieve much better performance isolation. For all noise settings and for all workloads except the latency-sensitive TPC-W, performance degradation is at most 25%; for TPC-W, performance degradation is between 3.5× and 5.7× as compared to the nominal noise-free case. In the following subsections, we present application-level scores for the evaluation workloads, together with measurements of the cpio metric that illustrate the differences between cgroups and the invention. We establish a baseline for the effectiveness of controls, by comparing with hand-tuned configurations specifically setup for performance isolation. We then examine the effectiveness of our proposed controls at three different noise settings.

In the remainder of this section, we present results that combine memory- and device-level control. Although memory-level control does have applicability at the low and mid noise settings, most applications need device access that results in contention at the device level, even with memory allocations that would seem to be adequate for serving the workload executing in the production VM. TPC-W, an OLTP workload, needs to regularly issue synchronous writes to guarantee atomicity and durability.

Figure 10:
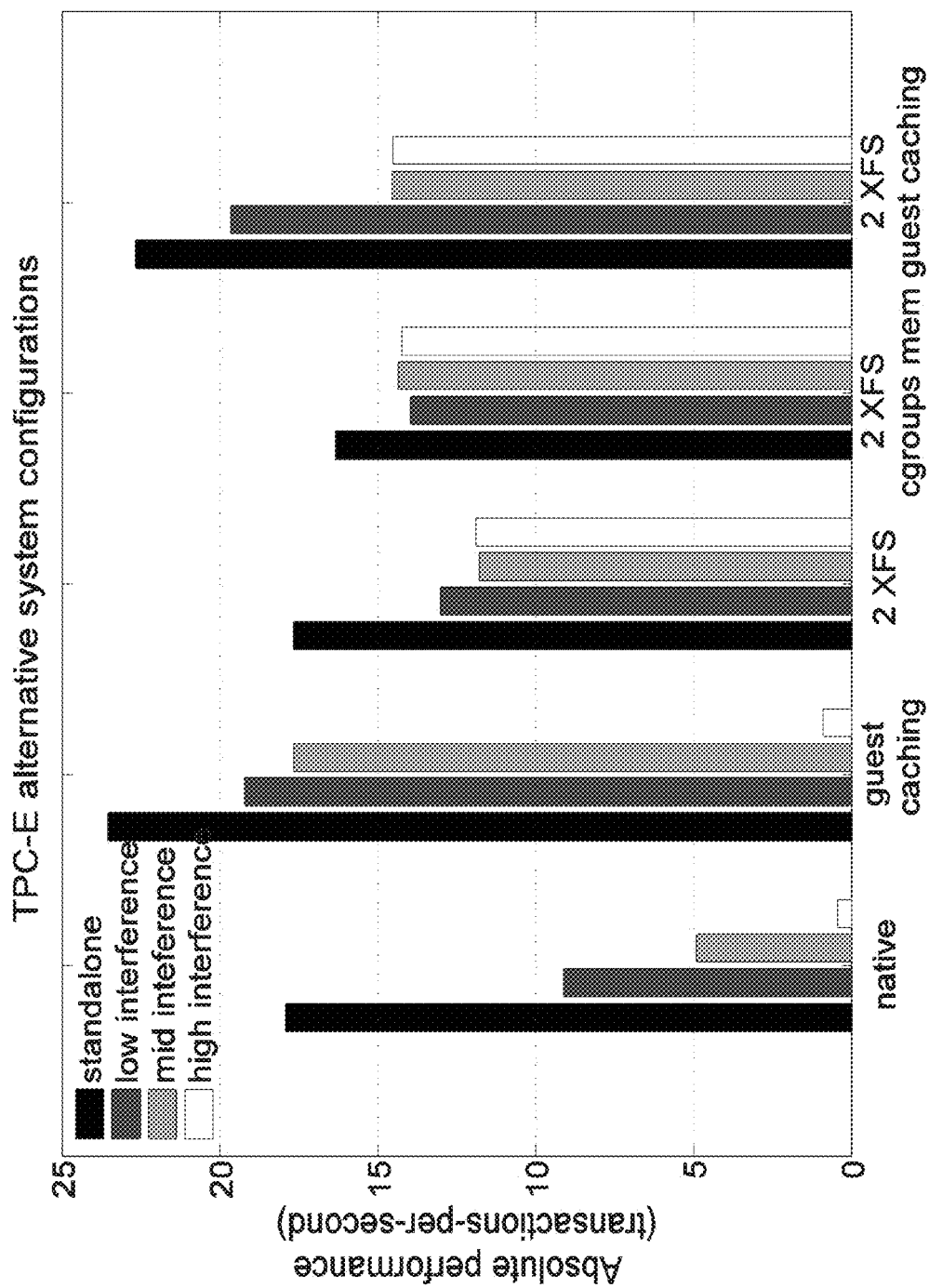
FIG. 10 is a comparison of different isolation configurations, using the TPC-E workload.

As a further example, TPC-H, an OLAP workload, issues read requests almost exclusively for executing the target query, but the database management system still issues a few write requests for its periodic checkpointing. Psearchy, a file processing workload, issues read requests for its input files, but also issues a few writes for gradually generating its output report. As a further complication, the run-time environment requires the virtual storage devices to be accessed in a write-through manner, to ensure recoverability for the VM's filesystem In FIG. 10 we examine how the impact of performance interference can be addressed by using hand-tuned system configurations aimed for improved isolation. The baseline for comparison is the performance of the native, unregulated configuration. For this exploration, we present results using the TPC-E workload, as it stresses the effectiveness of both memory- and device-level controls.

One alternative, is to provision the production VM with disproportionately more memory than the noise VM inside the guest; 13 GB of memory instead of 2 GB. Isolating memory by caching in the guest VM, is sufficient for low and mid levels of noise but the drop in performance under high noise is very steep (7% improvement with low noise, 1.5% degradation with mid noise, 19× degradation with high noise).

Another alternative is to isolate at the device level by creating two filesystem instances each with a dedicated SSD cache slice, with 2 GB allocated for the noise VM and 62 GB for the production VM. Isolating devices by creating two filesystem instances (one for each VM) we get better results, even for the high noise setting (from 38% to 52% degradation). We also explore two configurations that isolate both memory and devices: (a) use two filesystem instances and regulate memory using cgroups, with degradation from 25% to 28%, and (b) caching in the guest VM and use two filesystem instances.

Figure 11:
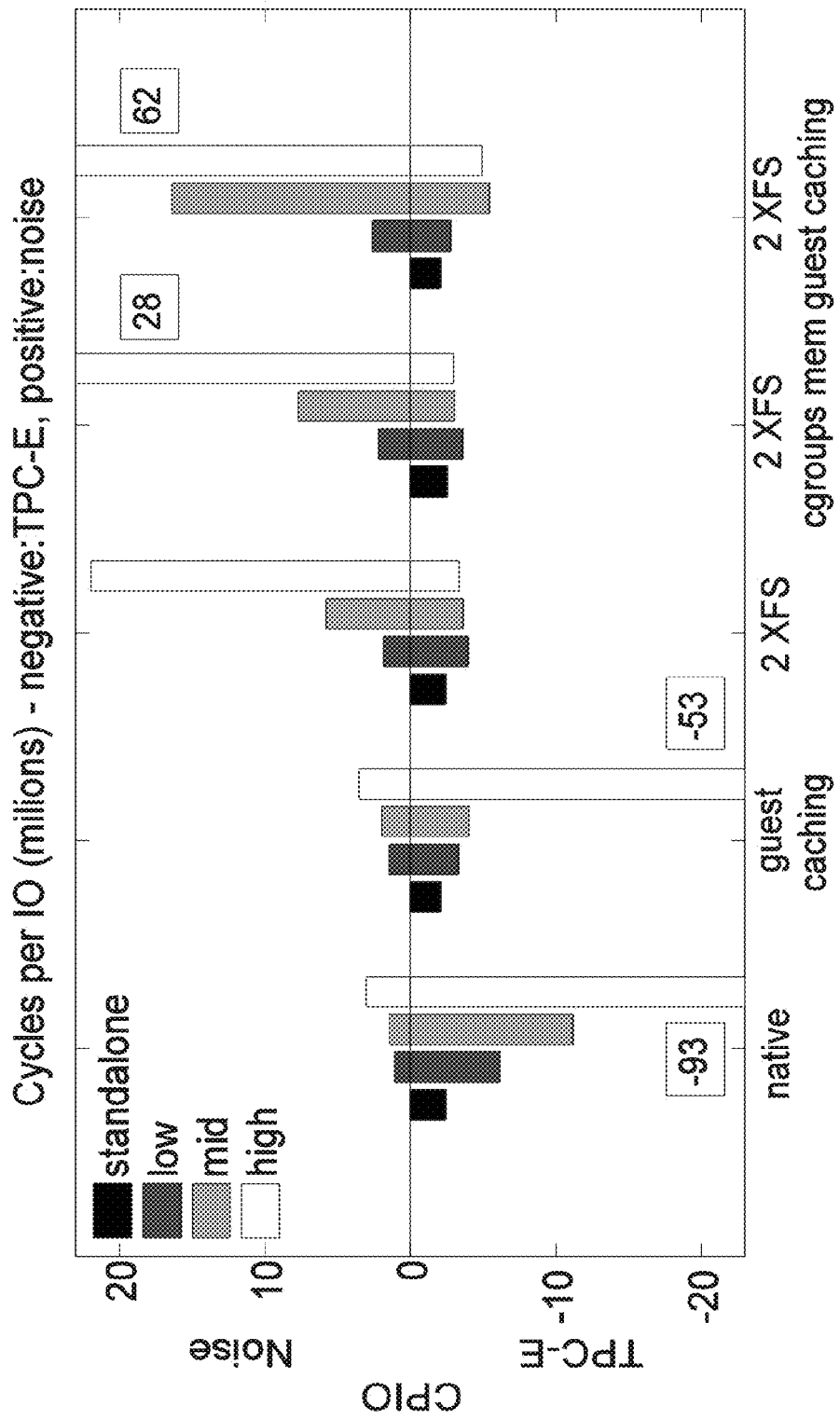
FIG. 11 shows cpio results for the comparison of FIG. 10.

Configuration (a) results in degradation around 28%. Configuration (b) results in 10% improvement for the low setting and from 10% to 23% degradation for the mid and high settings. However, (b) is an impractical configuration, since it requires reserving 6.5× the memory and/or two instances of a filesystem. Our technique achieves comparable performance for the mid and high noise settings, as shown below. FIG. 11 compares these configurations in terms of the cpio metric. Alternative control mechanisms differ in the trade-off between the cpio metric of the two VMs. cpio for TPCE without noise ranges from 2.00 millions to 2.67 millions. At the high noise setting the worst performing configuration (caching in the VM), results in a cpio value of 53.5 millions. In contrast, the best performing configuration (two filesystem instances and caching in the VM) results in a cpio value of 4.94 millions. This provides significant evidence that the cpio metric has indeed strong negative correlation with application level performance.

Figure 12:
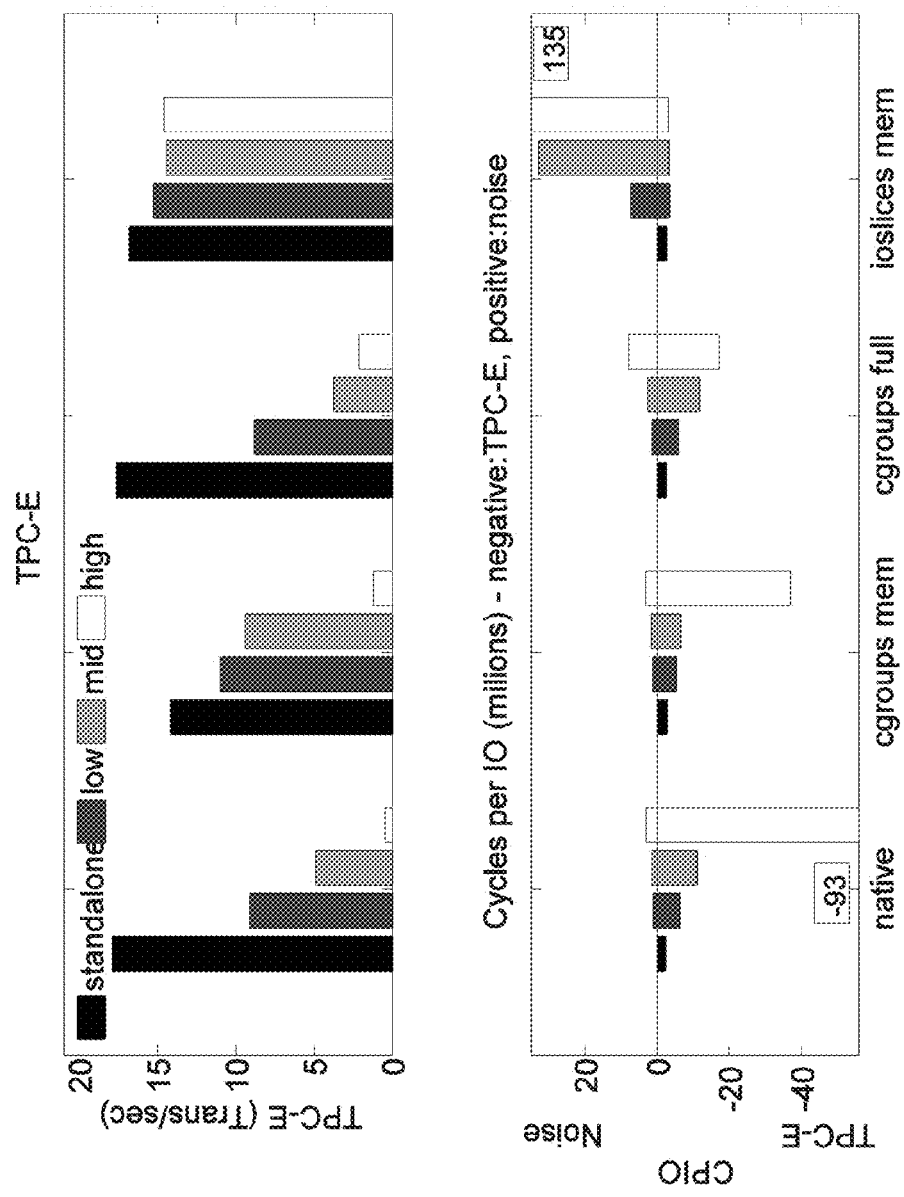
FIG. 12 is a graph showing the effectiveness of combined memory-level and device-level controls for the TPC-E workload.

FIG. 12 shows the absolute performance for the TPC-E workload, comparing the unregulated configuration with cgroups and the invention, using both memory- and device level controls. Using both controls is justified by the size of the workload, as it does not fit in memory. For completeness, our comparison includes an intermediate complexity configuration with cgroups enforcing only the memory-level control.

cgroups succeeds in isolation at the low and mid noise settings, with performance degradation around 50%. However, at the high noise setting, performance degradation is around one order of magnitude; with memory-level control, the performance degradation is 15×, whereas with the combined controls drops to 8×. With the invention, performance degradation does not exceed 15% at all noise settings. cpio scores are consistent with the application-level performance scores; the invention heavily favors the production VM, effectively throttling the noise VM, instead of attempting an (infeasible) balanced allocation.

An illustrating example is at the high noise setting; with cgroups the ratio of cpio scores for the production and noise VMs is 2.17, whereas with the invention it is 0.023. For the Psearchy workload running on the baseline unregulated system, we observe a 7× performance degradation in the case of the high noise setting. At the low-noise setting, there is no significant interference, as the working set can still be kept in-memory; however, at the mid-noise setting, performance degradation exceeds 2×. cgroups manages to protect against interference for the low and mid noise levels, keeping performance degradation below 10%; however, the degradation is 25% in the high-noise setting (2× more than the mid-noise level). With the invention, the corresponding degradation is only 50%.

Since Psearchy writes some output files to report its results, it makes sense to also evaluate the impact of device-level throttling. We observe no significant benefit with cgroups and device throttling. However, adding device throttling to the invention further reduces performance interference in the high-noise setting, down to 15%. From the cpio scores for these experiments, it is clear that the invention enforces a substantially different trade-off between the production and noise VMs, heavily favoring the production workload.

Figure 13:
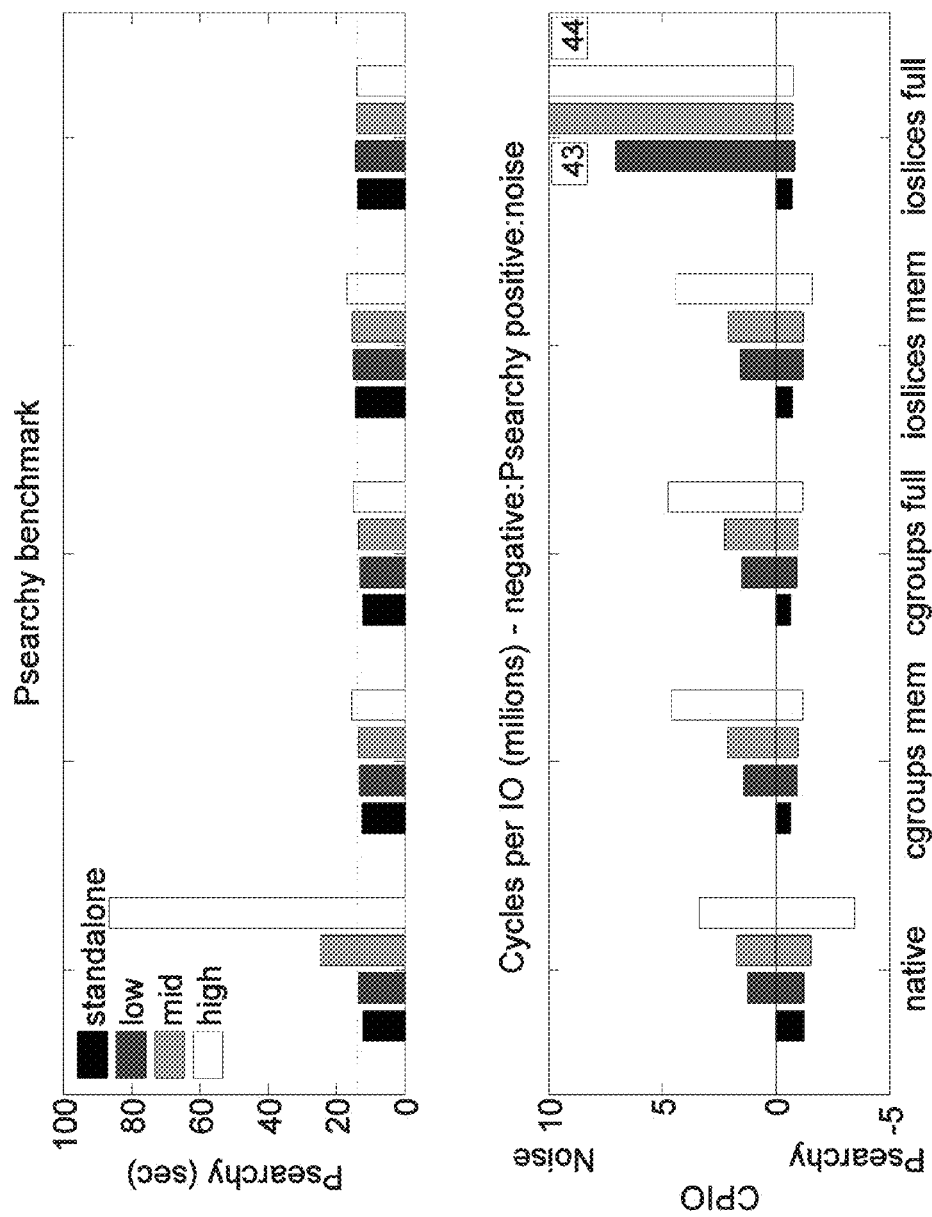
FIG. 13 is a graph showing the effectiveness of combined memory level and device-level controls for the Psearchy workload.

In contrast, cgroups appears to aim for a more balanced trade-off. We expect the invention to remain effective even for larger sizes of this workload, whereas cgroups is still allocating a significant share of the memory to the noise VM. Particularly with the invention and device-level throttling, the cpio score for the noise VM is 58× the production VMs, thus enforcing the priority of the production VM. In comparison, cgroups with and without device-level throttling the cpio score for the noise VM is around 3× the production VM's score, indicating a balanced but inefficient allocation. Similar results are shown in FIG. 13 for the TPC-H workload. The baseline system for the TPC-H workload suffers severe degradation, from to 2× to 16× for the mid and high noise settings respectively. cgroups protects against interference up to the mid noise setting, and suffers by 27% at the high noise setting. The invention outperforms cgroups, with only 7% degradation at the high noise setting. The cpio measurements show that the invention makes the appropriate trade-off, penalizing the noise VM rather than futilely striving to balance the allocation of resources between the VMs.

Figure 14:
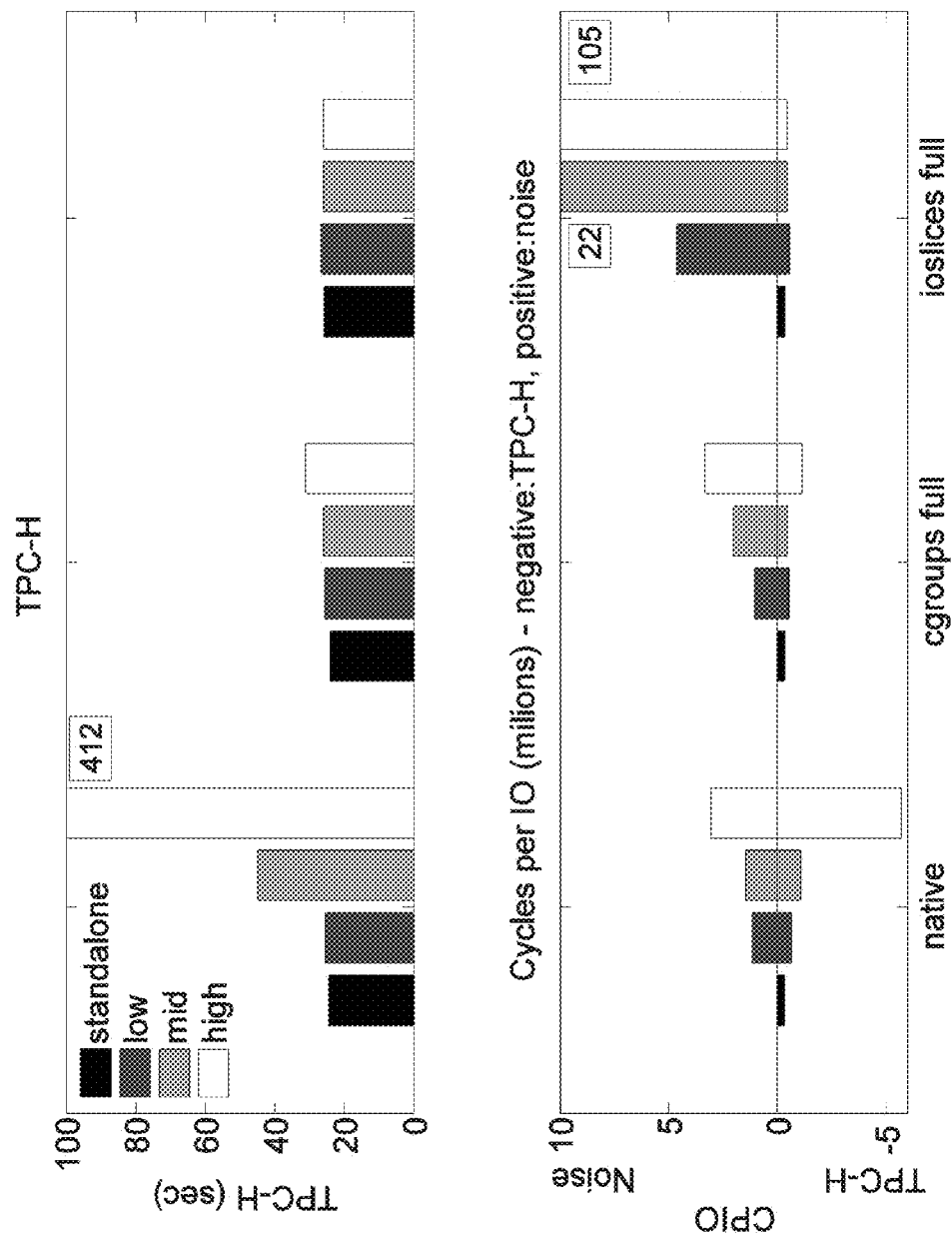
FIG. 14 is a graph showing the effectiveness of combined memory-level and device-level controls, for the TPC-H workload.
Figure 15:
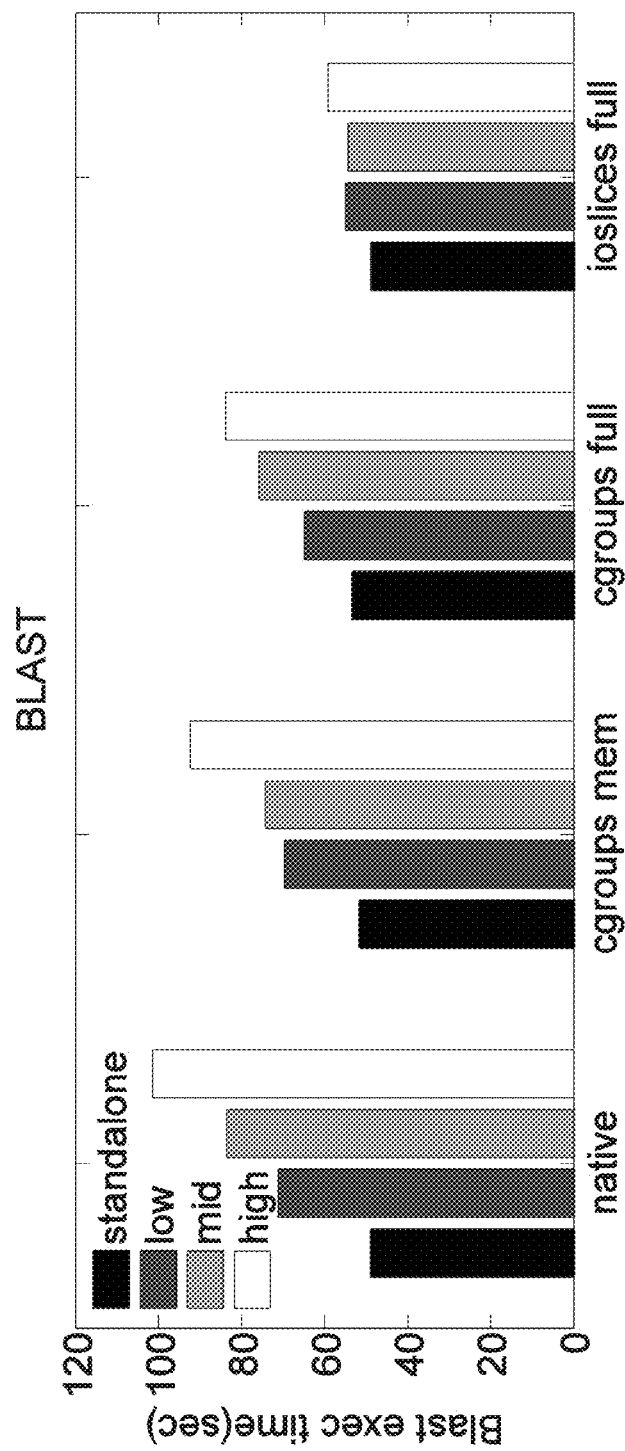
FIG. 15 is a chart showing the effectiveness of combined memory-level and device-level controls for the BLAST workload.

The BLAST workload in the experiments shown in FIG. 14 does not fit the memory available to the production VM, both within the VM and in the host-side memory cache, thus requiring device access. The cgroups configuration that only enforces a limit on memory achieves less isolation than the cgroups configuration that also enforces device access throttling. The configuration using the invention shows minimal performance degradation for the three noise levels, no more than 15% even at the high noise setting.

For BLAST, we are missing the cpio scores, as it was not possible to collect application level I/O counts. We used the strace utility to find out that BLAST uses mmap( ) and therefore accesses are not passing through the VFS entry-point for reads and writes. Moreover, source code for BLAST is not available for us to add instrumentation. We tried a variation of the cpio metric using the device-level I/O counts; however, this metric lacked strong correlation with application-level scores. Still, in line with previous results, we find that the invention achieves good isolation.

Various modifications to the invention are contemplated without departing from the spirit and scope of the invention which is defined in the claims that follow. For example, the partitioned I/O stack as herein described can be used in native operating system kernels, in the hypervisor, in the guest operating system kernel in a virtual machine, and combinations thereof. Furthermore, layers of the stack can be divided between guest and host operating systems to reduce layer overhead and to allow the hypervisor to cache data in DRAM in writeback mode, which is not possible with prior art systems. While various steps and computer components have been herein used, these are to be given their ordinary definition as would be known in the art, unless explicitly limited or otherwise herein defined. The above-described embodiments are intended to be examples of the present invention and alterations and modifications may be effected thereto, by those of skill in the art, without departing from the scope of the invention that is defined solely by the claims appended hereto.

We claim:

1. A method for storage input/output (I/O) path configuration in a system that includes at least one storage device with at least one computer processor; the method comprising
providing in the I/O path into at least:
(a) a block-based kernel-level filesystem,
(b) an I/O cache module controlling a partitioned I/O cache implemented on a first computer readable medium,
(c) a partitioned journaling module managing said partitions,
(d) a storage cache module controlling a partitioned storage cache implemented on a second computer readable medium, said second computer readable medium having a lower read/write speed than said first computer readable medium;
translating by said filesystem, based on computer executable instructions executed by said at least one processor, a file I/O request made by an application executed by said at least one computer processor into a plurality of block I/O requests, such that the file I/O request is assigned to I/O partitions;
fulfilling by said at least one processor each of said block I/O requests from one of said partitioned I/O cache, said partitioned storage cache and said partitioned journaling module, while isolating said requests to independent cache and journal partitions;
wherein said I/O cache module creates a plurality of independently partitioned cache structures, which each stores and handles a disjoined set of data blocks, mapped to one or more containers on said first computer readable medium, and said storage cache module creates a plurality of independent cache structures mapped to one or more containers on said second computer readable medium;
said journaling module creates a plurality of independent journal structures each maintaining a persistent transaction log and providing for the recovery of I/O operations in the event of a failed operation across partitions on said I/O cache.

2. A method according to claim 1, wherein said fulfilling step further comprises:
determining by the filesystem, to which partition an I/O request should be directed;
within the determined partition and independently from I/O requests to other partitions,
determining by said I/O cache module if each block being requested is in said I/O cache; and upon a condition in which said block being requested is in said I/O cache, fulfilling said block request from said I/O cache;
upon a condition in which said block being requested is not in said I/O cache, determining by said storage cache module if said block being requested is in said storage cache, and;
upon a condition in which said block being requested is in said storage cache, fulfilling said block request from said storage cache; upon a condition in which said block being requested is not in said storage cache, issuing a new I/O request.

3. A method according to claim 2, wherein prior to said step of determining by said storage cache module, comprising logging by said journaling module said block I/O request.

4. A method according to claim 3, wherein said logging comprises logging in a persistent transaction log.

5. A method according to claim 2, wherein said filesystem includes an allocator module; the method further comprising arranging by said allocator module storage space on each of said computer readable media into a plurality of containers, wherein each container comprises regions of sequential ranges on said media and using this information to isolate requests from each other by mapping address ranges to different partitions.

6. A method according to claim 2, wherein said first computer readable medium comprises volatile or non-volatile RAM and said second computer readable medium comprises a solid-state drive.

7. A method according to claim 1, wherein each of said partitions is implemented in the kernel space of a computer system.

8. A caching apparatus in the input/output (I/O) path of a computer system having at least one storage device with at least one computer processor comprising
- (a) a block-based kernel-level filesystem,
- (b) an I/O cache module controlling a partitioned I/O cache implemented on a first computer readable medium,
- (c) a partitioned journaling module managing said partitions,
- (d) a storage cache module controlling a partitioned storage cache implemented on a second computer readable medium, said second computer readable medium having a lower read/write speed than said first computer readable medium;

computer executable instructions executed by said at least one processor for translating by said filesystem a file I/O request made by an application executed by said at least one computer processor into a plurality of block I/O requests, such that the file I/O request is converted into I/O partitions;

computer executable instructions executed by said at least one processor fulfilling by said at least one processor each of said block I/O requests from one of said I/O cache, said storage cache and said partitioned journaling module, while isolating said requests to independent cache partitions;

wherein said I/O cache module creates a plurality of independently partitioned cache structures, which each store and handle a disjoined set of data blocks, mapped to one or more containers on said first computer readable medium, and said storage cache module creates a plurality of independent cache structures mapped to one or more containers on said second computer readable medium; said journaling module maintaining a persistent transaction log and providing for the recovery of I/O operations in the event of a failed operation across partitions on said I/O cache.

9. An apparatus according to claim 8, wherein
said I/O cache module determines if each said block being requested is in said I/O cache;
and upon a condition in which said block being requested is in said I/O cache, said block request is fulfilled from said I/O cache;
upon a condition in which said block being requested is not in said I/O cache, said storage cache module determines if said block being requested is in said storage cache, and; and upon a condition in which said block being requested is in said storage cache, said block request is fulfilled from said storage cache.

10. An apparatus according to claim 9, wherein prior to said storage cache module determining, said journaling module logs said block I/O request.

11. An apparatus according to claim 10, wherein said logging comprises logging in a persistent transaction log.

12. An apparatus according to claim 11, wherein said filesystem includes an allocator module; the said allocator module arranging storage space on each of said computer readable media into a plurality of containers, wherein each container comprises regions of sequential ranges on said media.

13. An apparatus according to claim 10, wherein said first computer readable medium comprises volatile or non-volatile RAM and said second computer readable medium comprises a solid-state drive.

14. A method for storage input/output (I/O) path configuration in a system that includes at least one storage device with at least one computer processor; the method comprising
providing in the I/O path into at least one of:
- (a) a block-based kernel-level filesystem,
- (b) an I/O cache module controlling a partitioned I/O cache implemented on a first computer readable medium,
- (c) a partitioned journaling module managing said partitions,
- (d) a storage cache module controlling a partitioned storage cache implemented on a second computer readable medium, said second computer readable medium having a lower read/write speed than said first computer readable medium;

translating by said filesystem, based on computer executable instructions executed by said at least one processor, a file I/O request made by an application executed by said at least one computer processor into a plurality of block I/O requests, such that the file I/O request is converted into I/O partitions;

fulfilling by said at least one processor each of said block I/O requests from one of said I/O cache, said storage cache and said partitioned journaling module, while isolating said requests to independent cache partitions;

wherein said I/O cache module creates a plurality of independently partitioned cache structures, which each store and handle a disjoined set of data blocks, mapped to one or more containers on said first computer readable medium, and said storage cache module creates a plurality of independent cache structures mapped to one or more containers on said second computer readable medium;

said journaling module maintaining a persistent transaction log and providing for the recovery of I/O operations in the event of a failed operation across partitions on said I/O cache.

* * * * *